(12) United States Patent
Yamagata et al.

(10) Patent No.: US 9,328,264 B2
(45) Date of Patent: May 3, 2016

(54) PRESSURE-SENSITIVE ADHESIVE COMPOSITION, PRESSURE-SENSITIVE ADHESIVE LAYER, AND PRESSURE-SENSITIVE ADHESIVE SHEET

(75) Inventors: Masato Yamagata, Ibaraki (JP); Natsuki Ukei, Ibaraki (JP); Junko Nakano, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 785 days.

(21) Appl. No.: 13/203,315

(22) PCT Filed: Feb. 23, 2010

(86) PCT No.: PCT/JP2010/052754
§ 371 (c)(1),
(2), (4) Date: Aug. 25, 2011

(87) PCT Pub. No.: WO2010/098314
PCT Pub. Date: Sep. 2, 2010

(65) Prior Publication Data
US 2011/0311810 A1 Dec. 22, 2011

(30) Foreign Application Priority Data
Feb. 27, 2009 (JP) ................. 2009-046672

(51) Int. Cl.
*C09J 7/02* (2006.01)
*C09J 133/08* (2006.01)
*C09J 183/12* (2006.01)
C08G 77/46 (2006.01)
C08L 83/04 (2006.01)
C08L 83/12 (2006.01)

(52) U.S. Cl.
CPC ............. *C09J 7/0207* (2013.01); *C09J 133/08* (2013.01); *C09J 183/12* (2013.01); *C08G 77/46* (2013.01); *C08L 83/04* (2013.01); *C08L 83/12* (2013.01); *C09J 7/0246* (2013.01); *C09J 2203/318* (2013.01); *C09J 2433/00* (2013.01); *C09J 2483/00* (2013.01)

(58) Field of Classification Search
None
See application file for complete search history.

(56) References Cited

U.S. PATENT DOCUMENTS

| | | |
|---|---|---|
| 2,929,835 A | 3/1960 | Boutsicaris et al. |
| 4,312,916 A | 1/1982 | Kakumaru et al. |
| 4,500,683 A | 2/1985 | Hori et al. |
| 4,668,730 A | 5/1987 | Iovine et al. |
| 4,918,211 A | 4/1990 | Yokota et al. |
| 4,968,558 A | 11/1990 | Fisher et al. |
| 5,147,925 A | 9/1992 | Pears et al. |
| 5,326,966 A | 7/1994 | Fukuda et al. |
| 5,378,405 A | 1/1995 | Gutman et al. |
| 5,433,892 A | 7/1995 | Czech |
| 5,508,107 A | 4/1996 | Gutman et al. |
| 5,574,117 A | 11/1996 | Yoshida et al. |
| 5,591,820 A | 1/1997 | Kydonieus et al. |
| 5,614,310 A | 3/1997 | Delgado et al. |
| 5,631,079 A | 5/1997 | Gutman et al. |
| 5,635,564 A | 6/1997 | Wieditz et al. |
| 5,721,313 A | 2/1998 | Yeung et al. |
| 5,885,708 A | 3/1999 | Lu et al. |
| 5,914,186 A | 6/1999 | Yau et al. |
| 5,952,398 A | 9/1999 | Dietz et al. |
| 5,985,990 A | 11/1999 | Kantner et al. |
| 6,548,605 B1 | 4/2003 | Morita et al. |
| 6,562,428 B1 | 5/2003 | Ohrui et al. |
| 6,783,850 B2 | 8/2004 | Takizawa et al. |
| 7,026,035 B2 | 4/2006 | Yano et al. |
| 7,491,758 B2 | 2/2009 | Amano et al. |
| 7,887,914 B2 | 2/2011 | Kobayashi et al. |
| 8,153,251 B2 | 4/2012 | Kobayashi et al. |
| 2002/0183442 A1 | 12/2002 | Wamprecht et al. |
| 2003/0091818 A1 | 5/2003 | Bamba et al. |
| 2004/0005136 A1 | 1/2004 | Okumura |
| 2004/0151903 A1 | 8/2004 | Niino et al. |
| 2004/0189907 A1 | 9/2004 | Tominaga et al. |
| 2005/0244633 A1 | 11/2005 | Kobayashi et al. |
| 2005/0256251 A1 | 11/2005 | Amano et al. |

(Continued)

FOREIGN PATENT DOCUMENTS

| | | |
|---|---|---|
| CN | 1517418 | 8/2004 |
| CN | 1973014 | 5/2007 |

(Continued)

OTHER PUBLICATIONS

Machine translation of JP 2007-092056 (no date).*
Machine translation of JP 2008-031293 (no date).*
Machine translation of JP 2009-292958 (no date).*
Notification of Reasons for Refusal dated Jul. 9, 2013 in Japanese patent application No. 2011-133151.
Notification of Reasons for Refusal dated Aug. 16, 2013 in Korean patent application No. 2011-120797.
Notice of Preliminary Rejection mailed Aug. 30, 2013 in Korean patent application No. 10-2012-85291.

(Continued)

*Primary Examiner* — Marc Zimmer
(74) *Attorney, Agent, or Firm* — Knobbe Martens Olson & Bear, LLP

(57) ABSTRACT

Provided is a pressure-sensitive adhesive composition that makes it possible to prevent electrification of a non-antistatic protected material during peeling, is reduced in the risk of staining the protected material, and has good removability, and to provide a pressure-sensitive adhesive layer, a pressure-sensitive adhesive sheet. Specifically provided is a pressure-sensitive adhesive composition which comprises: a (meth) acryl-based polymer including, as a main component, a (meth)acryl-based monomer component having an alkyl group of 1 to 14 carbon atoms; an alkali metal salt; and an organopolysiloxane having a polyoxyalkylene side chain, wherein the (meth)acryl-based polymer has an acid value of 1.0 or less, and the total amount of the alkali metal salt and the organopolysiloxane is from 0.15 to 4 parts by weight, based on 100 parts by weight of the (meth)acryl-based polymer.

14 Claims, 1 Drawing Sheet

(56) References Cited

U.S. PATENT DOCUMENTS

| | | |
|---|---|---|
| 2005/0266238 A1 | 12/2005 | Amano et al. |
| 2006/0045990 A1 | 3/2006 | Kim et al. |
| 2006/0057368 A1 | 3/2006 | Kobayashi et al. |
| 2006/0057371 A1 | 3/2006 | Kobayashi et al. |
| 2006/0088670 A1 | 4/2006 | Kim et al. |
| 2006/0163626 A1 | 7/2006 | Chen et al. |
| 2006/0177651 A1 | 8/2006 | Tomita |
| 2006/0279923 A1 | 12/2006 | Kim et al. |
| 2008/0023132 A1 | 1/2008 | Sano et al. |
| 2008/0311395 A1 | 12/2008 | Ukei et al. |
| 2009/0163626 A1 | 6/2009 | Ukei et al. |
| 2011/0311810 A1 | 12/2011 | Yamagata et al. |

FOREIGN PATENT DOCUMENTS

| | | |
|---|---|---|
| CN | 1872935 | 11/2013 |
| EP | 0 435 080 | 7/1991 |
| EP | 1 108 770 | 6/2001 |
| EP | 0 961 792 | 6/2002 |
| EP | 1 591 506 | 11/2005 |
| EP | 1 595 929 | 11/2005 |
| EP | 1 602 698 | 12/2005 |
| EP | 2 402 409 | 1/2012 |
| JP | 58-7470 | 1/1983 |
| JP | 2-080030 | 3/1991 |
| JP | 3-122165 | 5/1991 |
| JP | 04-117475 | 4/1992 |
| JP | 5-9449 | 1/1993 |
| JP | 05-009449 | 1/1993 |
| JP | 5-320625 | 12/1993 |
| JP | 6-65551 | 3/1994 |
| JP | 6-100655 | 4/1994 |
| JP | 06-128539 | 5/1994 |
| JP | 6-128539 A | 5/1994 |
| JP | 6-128539 | 10/1994 |
| JP | 7-104125 | 4/1995 |
| JP | 7-157741 | 6/1995 |
| JP | 7-310066 | 11/1995 |
| JP | 8-104857 | 4/1996 |
| JP | 8-155040 | 6/1996 |
| JP | 2543545 B | 7/1996 |
| JP | 9-59581 | 3/1997 |
| JP | 9-87354 | 3/1997 |
| JP | 9-165460 | 6/1997 |
| JP | 09-165460 | 6/1997 |
| JP | 09-208910 | 8/1997 |
| JP | 2-750719 | 5/1998 |
| JP | 10-168407 | 6/1998 |
| JP | 11-256116 | 9/1999 |
| JP | 2980874 | 9/1999 |
| JP | 2000-44912 | 2/2000 |
| JP | 3012860 | 2/2000 |
| JP | 2000-129235 | 5/2000 |
| JP | 2000-273417 | 10/2000 |
| JP | 2001-49205 | 2/2001 |
| JP | 2001-146581 | 5/2001 |
| JP | 2001-220474 | 8/2001 |
| JP | 2001 234147 | 8/2001 |
| JP | 2001 -234147 | 8/2001 |
| JP | 2001-512508 | 8/2001 |
| JP | 2001-240830 | 9/2001 |
| JP | 2001-305346 | 10/2001 |
| JP | 2001-316643 | 11/2001 |
| JP | 2001-348552 | 12/2001 |
| JP | 2002-019039 | 1/2002 |
| JP | 2002-293870 | 10/2002 |
| JP | 2002 333525 | 11/2002 |
| JP | 2003-41205 | 2/2003 |
| JP | 2003-041229 | 2/2003 |
| JP | WO 03/011958 | 2/2003 |
| JP | 2003-147325 | 5/2003 |
| JP | 2003-291290 | 10/2003 |
| JP | 3473701 | 12/2003 |
| JP | 2004-034631 | 2/2004 |
| JP | 2004 264866 | 9/2004 |
| JP | 2004-287199 A | 10/2004 |
| JP | 2005-023143 | 1/2005 |
| JP | 2005-036205 | 2/2005 |
| JP | 2007-92056 | 4/2005 |
| JP | 2005-200607 | 7/2005 |
| JP | 2005-206776 | 8/2005 |
| JP | 2005-213455 | 8/2005 |
| JP | 2005-298569 | 10/2005 |
| JP | 2005-314476 | 11/2005 |
| JP | 2005-314579 | 11/2005 |
| JP | 2005-325255 | 11/2005 |
| JP | 2007-536427 | 12/2005 |
| JP | 2006-111856 | 4/2006 |
| JP | 2006-130672 | 5/2006 |
| JP | 2006-290994 | 10/2006 |
| JP | 2008-31293 | 2/2008 |
| JP | 2008-032852 | 2/2008 |
| JP | 2008-063527 | 3/2008 |
| JP | 2002-241708 | 8/2008 |
| JP | 2009-091406 | 4/2009 |
| JP | 2009-275128 | 11/2009 |
| JP | 2009-292958 | 12/2009 |
| JP | 4420389 | 2/2010 |
| JP | 2010-202692 | 9/2010 |
| JP | 4562070 | 10/2010 |
| JP | 2012-0158633 | 8/2012 |
| TW | 201035268 | 10/2010 |
| WO | WO 98/36005 | 8/1998 |
| WO | WO 00/24839 | 5/2000 |
| WO | WO 2006/022512 | 3/2006 |
| WO | WO 2007/029681 | 3/2007 |
| WO | WO 2010/098314 | 9/2010 |

OTHER PUBLICATIONS

Notification of Reasons for Refusal dated Aug. 16, 2013 in Japanese patent application No. 2011-120797.
Submission of Information dated Dec. 25, 2013 in Japanese patent application No. 2011-133151.
Examination Report dated May 23, 2014 in corresponding Taiwanese patent application No. 099105577.
Office Action dated May 8, 2014 in Taiwanese patent application No. 101128142.
Second Office Action issued in Chinese corresponding patent application No. 201080006930.8, dated May 30, 2013.
First Office Action dated Nov. 25, 2013 in Chinese patent application No. 201210274596.5.
Decision of Refusal dated Feb. 18, 2014 in Japanese patent application No. 2012-175113.
Chapter 19. Acrylic Adhesives: Composition, in Handbook of Pressure Sensitive Adhesive Technology, Third Edition, Donatas Satas ed., pp. 444-447, Satas & Associates, Warwick, RI, 1999.
Notification of Reasons for Refusal dated Dec. 7, 2012 in Japanese patent application No. 2012-173002.
Notification of Reasons for Refusal dated Mar. 14, 2013 in Japanese patent application No. 2012-173002.
Notice of Final Rejection mailed by Korean Intellectual Property Office on Nov. 30, 2012 in Korean patent application No. 10-2005-0035503.
Decision of Appeal issued in Japanese patent application No. 2004-135167, dated Dec. 21, 2012.
Hearing issued in Japanese patent application No. 2006-237851, dated Dec. 18, 2012.
Extended European Search Report issued in patent application No. 12179150.3, dated Jan. 2, 2013.
Database WPI, Section Ch, Week 199423, Derwent Publications Ltd., London, GB: Class A14, AN 1994-189173, XP002343566.
Shin-Nakamura Chemical Co., Ltd., "Product Name: NK ESTER AM-90G" Jun. 2001, (Searching Date: May 28, 2008), URL:http://www.shin-nakamura.com/monoma/AM-90G.htm.
"Electrical Properties of Polymers" edited by Yasaku Wada, published by Shokabo Publishing Co., Ltd. Aug. 15, 1987.
Fujimoto, T., Shin Kaimenkasseizai Nyuumon, 1996, p. 277.
"Adhesive Hand Book, the first edition", edited by Japan Adhesive Tape Manufactures Association, Adhesive Hand Book Editorial Committee, Mar. 2, 1985, the front page, the contents page, p. 79 and the colophon.

(56) References Cited

OTHER PUBLICATIONS

Notification for of Reasons for Refusal dated Nov. 12, 2013 in Japanese patent application No. 2012-175133.
LeMay Jr., et al., eds., Chemistry: Connections to Our Changing World, Prentice Hall, Upper Saddle River, New Jersey, 2002, p. 77.
Prichard, Antistatic Agents, in Plastic Additives: an A-Z Reference, ed. Prichard, Chapman & Hall, London, 1998, pp. 108-113.
Office Action issued in corresponding Chinese patent application No. 201080006930.8, dated Nov. 27, 2012.
Chinese Office Action dated Sep. 29, 2014 in corresponding Chinese Patent Application No. 201310176554.2.
Submission of Information dated Nov. 7, 2014 in Japanese Patent Application No. 2012-175113.
Japanese Office Action dated Oct. 3, 2014 in Japanese Patent Application No. 2011-133151.
Taiwanese Office Action dated Nov. 14, 2014 in Taiwanese Patent Application No. 099105577.
Japanese Submission of Information dated Dec. 4, 2014 in Japanese Patent Application No. 2014-099731.
The English translation of the international preliminary report on patentability (Chapter 1) issued by the International Bureau of WIPO on Sep. 13, 2011 in the corresponding PCT patent application No. PCT/JP2010/052754.
Chinese Office Action dated Nov. 27, 2014 in Chinese Patent Application No. 201310353486.2.
Japanese Office Action dated Nov. 7, 2014 in Japanese Patent Application No. 2012-175113.
Taiwanese Office Action dated Nov. 14, 2014 in corresponding Taiwanese Patent Application No. 101128142.
Chinese Office Action dated Jul. 15, 2014 in Chinese Patent Application No. 201210274596.5.
Notification of Reasons for Refusal dated Jun. 19, 2015 in corresponding Japanese patent application No. 1014-011780.
Taiwanese Office Action, dated Jul. 17, 2015, in Taiwanese Patent Application No. 101128142.
Extended European Search Report, dated Jul. 28, 2015, in corresponding European Patent Application No. 10746195.6.
Decision of Refusal dated Sep. 15, 2015 in Japanese patent application No. 2014-099731.
Shin-Etsu modified Silicone Fluid cat pp. 1, 4-5, 9-10 (2006).
U.S. Office Action, dated Oct. 29, 2015, in corresponding to the U.S. Appl. No. 13/566,062.
Korean Office Action issued in corresponding Korean Patent Application No. 10-2011-7019910, dated Sep. 18, 2015.
Notification of Reasons for Refusal dated Jun. 19, 2015 in corresponding Japanese Patent Application No. 2014-011780.
Japanese Office Action dated Jul. 3, 2015 in Japanese Patent Application No. 2014-099731.
Chinese Office Action in Chinese Patent Application No. 201210274596.5.
Japanese Decision of Refusal in Japanese Patent Application No. 2011-133151.
Chinese Office Action in Chinese Patent Application No. 201210274596.6.
EP Offer of Information in EP Patent Application No. 05020102.9.
EP Offer of Information in EP Patent Application No. 10182959.6.
Trial Board Decision dated Dec. 18, 2013 in Korean Patent Application No. 10-2005-0035503.
Notification of Reasons for Refusal dated Nov. 26, 2013 in corresponding Japanese patent application No. 2009-046672.
Third Office Action dated Dec. 8, 2015 in corresponding Chinese Patent Application No. 201310176554.2.
Japanese Office Action dated Jan. 6, 2016 in corresponding Japanese Patent Application No. 2014-011780.

* cited by examiner

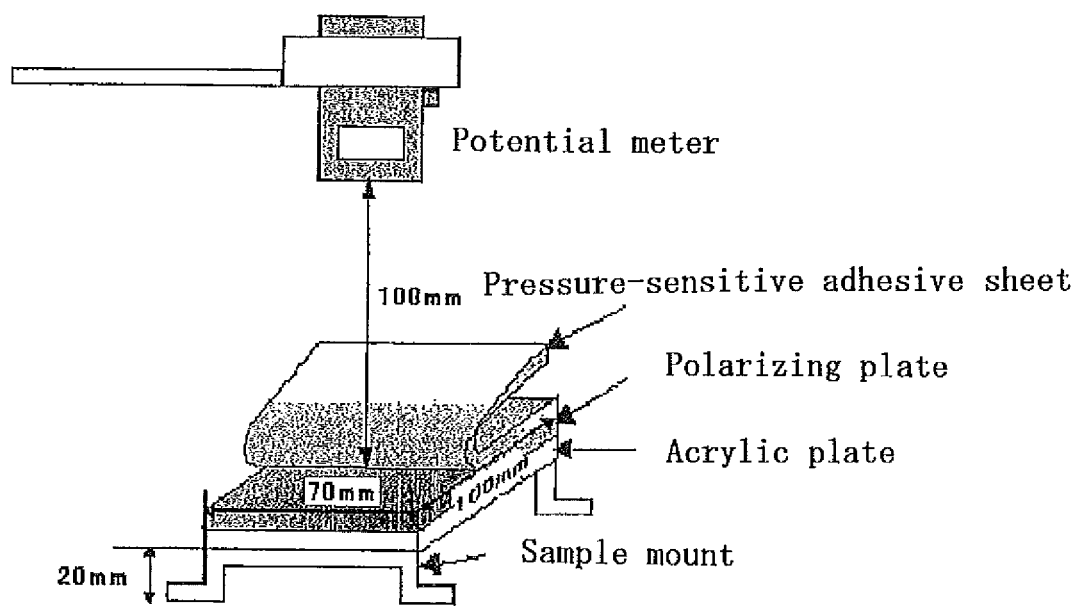

PRESSURE-SENSITIVE ADHESIVE COMPOSITION, PRESSURE-SENSITIVE ADHESIVE LAYER, AND PRESSURE-SENSITIVE ADHESIVE SHEET

This application is the U.S. National Phase under 35 U.S.C. §371 of International Application No. PCT/JP2010/052754, filed Feb. 23, 2010, which claims priority to Japanese Patent Application No. 2009-046672, filed Feb. 27, 2009. The International Application was not published in English under PCT Article 21(2).

TECHNICAL FIELD

The present invention relates to pressure-sensitive adhesive compositions, pressure-sensitive adhesive layers and pressure-sensitive adhesive sheets.

The pressure-sensitive adhesive sheet produced with the pressure-sensitive adhesive composition of the invention is used in plastic products and other products vulnerable to static electricity. In particular, the pressure-sensitive adhesive sheet is useful as a surface protecting film for protecting the surface of an optical component for use in a liquid crystal display or the like, such as a polarizing plate, a wavelength plate, a retardation plate, an optical compensation film, a reflective sheet, or a brightness enhancement film.

BACKGROUND ART

In recent years, for transportation of optical or electronic components or mounting of optical or electronic components on printed boards, each component is often packed with a given sheet, or a pressure-sensitive adhesive tape is often attached to each component, before transfer. In particular, surface protecting films are widely used in the field of optical or electronic components.

In general, such surface protecting films are attached to materials to be protected through a pressure-sensitive adhesive layer provided on a backing film side and used to prevent scratching or staining during the processing or transportation of the materials. For example, a liquid crystal display panel is formed by bonding optical components such as polarizing plates and wave plates to a liquid crystal cell through pressure-sensitive adhesive layers. The surface protecting film is bonded to any of these optical components with the pressure-sensitive adhesive interposed therebetween, so that the component is protected from scratching or staining during processing or transportation. The surface protecting film can be peeled off and removed when becomes unnecessary.

In general, surface protecting films and optical components are made of plastic materials and therefore are highly electrically insulating and can generate static electricity when they are rubbed or peeled off. Therefore, static electricity is generated even when a surface protecting film is peeled off from an optical component such as a polarizing plate, and if a voltage is applied to a liquid crystal in such a state that the generated static electricity still remains, the orientation of the liquid crystal molecule may be degraded, or defects may be produced in the panel.

The presence of static electricity can create a risk of absorbing dust or dirt or a risk of reducing workability. To solve the problem, therefore, surface protecting films undergo various antistatic treatments.

To suppress such electrostatic build-up, there has been disclosed an antistatic method that includes adding a low-molecular-weight surfactant to a pressure-sensitive adhesive and transferring the surfactant from the pressure-sensitive adhesive to the object to be protected (see for example Patent Document 1). In this technique, however, the added low-molecular-weight surfactant easily bleeds out to the surface of the pressure-sensitive adhesive, and if this technique is applied to a surface protecting film, there may be a risk of staining the protected material. Therefore, if a low-molecular-weight-surfactant-containing pressure-sensitive adhesive is applied to an optical component-protecting film, there may be a particular risk of degrading the optical properties of the optical component.

There is also disclosed a pressure-sensitive adhesive sheet having a pressure-sensitive adhesive layer containing an antistatic agent (see for example Patent Document 2). In this pressure-sensitive adhesive sheet, an antistatic agent including propylene glycol and an alkali metal salt is added to an acryl-based pressure-sensitive adhesive so that the antistatic agent can be prevented from bleeding out to the surface of the pressure-sensitive adhesive. Even when this pressure-sensitive adhesive sheet is used, however, the phenomenon of bleeding of the antistatic agent is inevitable, so that when the antistatic agent is actually applied to a surface protecting film and aged or subjected to high-temperature treatment, there is a risk of causing a phenomenon in which the surface protecting film is partially lifted up from the protected material due to the bleeding phenomenon.

The film is also required to be easily peelable from an optical component without causing troubles due to the distortion phenomenon associated with peeling, such as disturbances in the orientation of a liquid crystal cell, an increase in the cell gap, and peeling of the optical component from a liquid crystal cell. In recent years, as the screen size of liquid crystal panels has increased, the area of protective films has increased, and the peeling speed has also increased. Therefore, easier peelability has been demanded.

Patent Publication 1: JP-A No. 9-165460
Patent Publication 2: JP-A No. 6-128539

DISCLOSURE OF THE INVENTION

Problems to be Solved by the Invention

To solve the problems with conventional antistatic pressure-sensitive adhesive sheets, therefore, an object of the invention is to provide a pressure-sensitive adhesive composition that makes it possible to prevent electrification of a non-antistatic protected material during peeling, is reduced in the risk of staining the protected material, and has good removability, and to provide a pressure-sensitive adhesive layer, a pressure-sensitive adhesive sheet, and a surface protecting film each produced with such a pressure-sensitive adhesive composition.

Means for Solving the Problems

Specifically, the pressure-sensitive adhesive composition of the invention includes: a (meth)acryl-based polymer that includes, as a main component, a (meth)acryl-based monomer component having an alkyl group of 1 to 14 carbon atoms and has an acid value of 1.0 or less; an alkali metal salt; and an organopolysiloxane having a polyoxyalkylene side chain, wherein the total amount of the alkali metal salt and the organopolysiloxane is from 0.15 to 4 parts by weight, based on 100 parts by weight of the (meth)acryl-based polymer. The use of the pressure-sensitive adhesive composition of the invention makes it possible to prevent electrification of a non-antistatic adherend (protected material) during peeling, to reduce the risk of staining the adherend, and to provide a pressure-sensitive adhesive composition with good removability. It is considered that the simultaneous use of an alkali metal salt and an organopolysiloxane having a polyoxyalkylene side chain makes it possible to increase ionic conduction efficiency so that antistatic properties can be imparted to the protected material. It is also considered that balanced compatibility with the acryl-based polymer makes it possible to reduce bleeding phenomenon-induced staining. It is also considered that the organopolysiloxane having a polyoxyalkylene side chain reduces the surface free energy of the pressure-sensitive adhesive surface to enable removability.

Preferably, in the pressure-sensitive adhesive composition, the organopolysiloxane is represented by the formula:

[Formula 1]

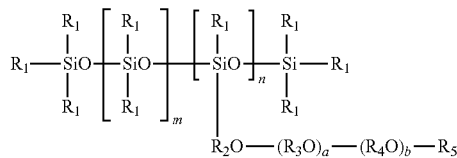

wherein $R_1$ represents a monovalent organic group, $R_2$, $R_3$, and $R_4$ each represent an alkylene group, or $R_5$ represents a hydroxyl group or an organic group, m and n each represent an integer of 0 to 1,000, provided that m and n are not simultaneously 0, and a and b each represent an integer of 0 to 100, provided that a and b are not simultaneously 0.

Preferably, in the pressure-sensitive adhesive composition, the alkali metal salt is a lithium salt.

Preferably, in the pressure-sensitive adhesive composition, the (meth)acryl-based polymer further comprises a hydroxyl group-containing (meth)acryl-based monomer component.

Preferably, in the pressure-sensitive adhesive composition, the (meth)acryl-based polymer further comprises 5.0% by weight or less of an alkylene oxide group-containing reactive monomer component with an average addition mole number of oxyalkylene units of 3 to 40.

The pressure-sensitive adhesive layer preferably comprises a product produced by crosslinking the pressure-sensitive adhesive composition.

The pressure-sensitive adhesive sheet comprises a backing film and the pressure-sensitive adhesive layer formed on one or both sides of the backing film.

Preferably, in the pressure-sensitive adhesive sheet, the backing film is an antistatic-treated plastic film.

Preferably, in the pressure-sensitive adhesive sheet, the pressure-sensitive adhesive layer has a 180° peel adhesion of 0.25 N/25 mm or less to a polarizing plate surface under conditions of 23° C. and 50% RH at a peel rate of 0.3 m/minute and has a 180° peel adhesion of 3.0 N/25 mm or less to a polarizing plate surface under conditions of 23° C. and 50% RH at a peel rate of 30 m/minute.

BRIEF DESCRIPTION OF THE DRAWING

FIG. 1 is a schematic construction view of an electrostatic measuring part used for measuring a peeling electrification voltage in Examples.

BEST MODE FOR CARRYING OUT THE INVENTION

The embodiments of the present invention are hereinafter described in detail.

The pressure-sensitive adhesive composition of the invention contains: a (meth)acryl-based polymer including, as a main component, a (meth)acryl-based monomer component having an alkyl group of 1 to 14 carbon atoms; an alkali metal salt; and an organopolysiloxane having a polyoxyalkylene side chain, wherein the (meth)acryl-based polymer has an acid value of 1.0 or less, and the total amount of the alkali metal salt and the organopolysiloxane is from 0.15 to 4 parts by weight, based on 100 parts by weight of the (meth)acryl-based polymer.

The (meth)acryl-based polymer in the present invention refers to an acryl-based polymer and/or a methacryl-based polymer. And the (meth)acrylate in the present invention refers to an acrylate and/or a methacrylate.

The (meth)acryl-based polymer for use in an embodiment of the invention may be any type of (meth)acryl-based polymer containing the (meth)acryl-based monomer component and having adherability.

In an embodiment of the invention, a monomer component of the (meth)acryl-based polymer is formed using a (meth)acrylate having an alkyl group of 1 to 14 carbon atoms, preferably a (meth)acrylate having an alkyl group of 6 to 14 carbon atoms, so that balanced compatibility with the alkali metal salt and good adhesive properties can obtained. As for the (meth)acrylate, one or more (meth)acrylates may be used as main components.

The (meth)acryl-based polymer including, as a main component, a (meth)acrylate having an alkyl group of 1 to 14 carbon atoms is preferably a (meth)acryl-based polymer including, as a monomer component, 50 to 99.9% by weight of a (meth)acrylate having an alkyl group of 1 to 14 carbon atoms, more preferably a (meth)acryl-based polymer including, as a monomer component, 60 to 95% by weight of a (meth)acrylate having an alkyl group of 1 to 14 carbon atoms. Keeping the content of the monomer component within the range is preferred in term of imparting an adequate level of wettability and cohesive strength to the pressure-sensitive adhesive composition.

In an embodiment of the invention, examples of the (meth)acrylate having an alkyl group of 1 to 14 carbon atoms include methyl(meth)acrylate, ethyl(meth)acrylate, n-butyl(meth)acrylate, sec-butyl(meth)acrylate, tert-butyl(meth)acrylate, isobutyl(meth)acrylate, hexyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, and n-tetradecyl(meth)acrylate.

Particularly when the pressure-sensitive adhesive sheet of the invention is for use as a surface protecting film, preferred examples include (meth)acrylates having an alkyl group of 6 to 14 carbon atoms, such as hexyl(meth)acrylate, 2-ethylhexyl(meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, and n-tetradecyl(meth)acrylate. The use of a (meth)acrylate having an alkyl group of 6 to 14 carbon atoms makes it easy to control the adhesive power to the adherend at a low level, so that good removability is achieved.

In an embodiment of the invention, the (meth)acryl-based polymer to be used has an acid value of 1.0 or less, preferably an acid value of 0.5 or less. If the (meth)acryl-based polymer has an acid value of more than 1.0, the adhesive power to the protected material will be so high that antistatic performance may fail to be obtained. These phenomena are considered to occur because the adhesive power to the protected material is high due to the presence of a large number of carboxyl groups, which have a high polar effect, in the skeleton of the (meth) acryl-based polymer and because the alkali metal ions interact with the carboxyl groups to interfere with ionic conduction and to reduce electrical conduction efficiency. In an embodiment of the invention, therefore, the (meth)acrylate-based polymer to be used should be substantially free of acrylate and/or methacrylate structural units having an acid functional group such as a carboxyl group or a sulfonate group so that the acid value can be 1.0 or less. Specifically, for example, when the (meth)acryl-based polymer to be used is a copolymer of 2-ethylhexyl acrylate and acrylic acid, a monomer having a carboxyl group, the amount of acrylic acid should be 0.13 parts by weight or less based on 100 parts by weight of the total amount of 2-ethylhexyl acrylate and acrylic acid, so that the acid value can be adjusted to 1.0 or less.

In an embodiment of the invention, the acid value of the (meth)acryl-based polymer refers to the mg amount of potassium hydroxide required to neutralize the free fatty acids, resin acids, and other acids contained in 1 g of a sample.

As for other monomer components, polymerizable monomers for controlling the glass transition temperature (Tg) or peeling properties of the (meth)acryl-based polymer so that the Tg can be 0° C. or lower (generally −100° C. or higher) may be used in terms of easy balancing of adhesive performance, as long as the effects of the invention are not reduced.

For example, other polymerizable monomers except for (meth)acrylate monomers having a carboxyl group, a sulfonate group, a phosphate group, or an acid anhydride group may be used without restriction to form the (meth)acryl-based polymer. In particular, (meth)acrylates having a hydroxyl group (hydroxyl group-containing (meth)acryl-based monomers) are preferably used, because crosslinking can be easily controlled with them.

The use of the (meth)acryl-based monomer having a hydroxyl group makes it possible to easily control crosslinking of the pressure-sensitive adhesive composition, so that the balance between an improvement in wettability based on fluidity and a reduction in adhering strength for peeling can be easily controlled. In addition, the hydroxyl group has an adequate level of interaction with the alkali metal salt and the organopolysiloxane having a polyoxyalkylene side chain, in contrast to the carboxyl or sulfonate group usually capable of acting as a crosslinking site, and therefore is preferably used in view of antistatic performance. Examples of the hydroxyl group-containing monomer include 2-hydroxyethyl(meth) acrylate, 2-hydroxypropyl(meth)acrylate, 4-hydroxybutyl (meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, (4-hydroxymethylcyclohexyl)methyl acrylate, N-methylol(meth)acrylamide, vinyl alcohol, allyl alcohol, 2-hydroxyethyl vinyl ether, 4-hydroxybutyl vinyl ether, and diethylene glycol monovinyl ether.

When the hydroxyl group-containing (meth)acryl-based monomer is added, the amount of the hydroxyl group-containing (meth)acryl-based monomer component is preferably from 0.1 to 10 parts by weight, more preferably from 0.5 to 8 parts by weight, based on 100 parts by weight of all structural units of the (meth)acryl-based polymer. The above range is preferred because the balance between the wettability and the cohesive strength of the pressure-sensitive adhesive composition is easily controlled within the range.

In an embodiment of the invention, examples of other polymerizable monomers that may be used as needed in addition to the above monomers to form the (meth)acryl-based polymer include cohesive strength/heat resistance improving components such as cyano group-containing monomers, vinyl ester monomers, and aromatic vinyl monomers; and components having a functional group capable of improving adhesive strength or serving as a crosslinking base point, such as amide group-containing monomers, imide group-containing monomers, amino group-containing monomers, epoxy group-containing monomers, N-acryloylmorpholine, and vinyl ether monomers. These monomer compounds may be used alone or in a mixture of two or more.

Examples of the cyano-group-containing monomer include acrylonitrile, and methacrylonitrile.

Examples of the vinyl esters include vinyl acetate, vinyl propionate, and vinyl laurate.

Examples of the aromatic vinyl-based monomer include styrene, chlorostyrene, chloromethylstyrene, α-methylstyrene, and other substituted styrene.

Examples of the amide-group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetone acrylamide.

Examples of the amino-group-containing monomer include aminoethyl(meth)acrylate, N,N-dimethylaminoethyl (meth)acrylate, and N,N-dimethylaminopropyl(meth)acrylate.

Examples of the imide-group-containing monomer include cyclohexylmaleimide, isopropylmaleimide, N-cyclohexylmaleimide, and itaconic imide.

Examples of the epoxy-group-containing monomer include glycidyl(meth)acrylate, methylglycidyl(meth)acrylate, and allyl glycidyl ether.

Examples of the vinyl ether monomer include methyl vinyl ether, ethyl vinyl ether, and isobutyl vinyl ether.

In the invention, the other polymerizable monomers may be used alone or may be used in the form of a mixture of two or more thereof. The content of the whole of the monomer(s) is preferably from 0 to 40 parts by weight, more preferably from 0 to 35 parts by weight, still more preferably from 0 to 30 parts by weight with respect to 100 parts by weight of the (meth)acryl-based polymer. The use of other polymerizable monomers allows appropriate control of the adhesive property and the interaction with the alkali metal salt in a favorable manner.

In the pressure-sensitive adhesive composition of the invention, the (meth)acryl-based polymer preferably further contains 5.0% by weight or less of an alkylene oxide group-containing reactive monomer component with an average addition mole number of oxyalkylene units of 3 to 40.

The average addition mole number of oxyalkylene units in the alkylene oxide group-containing reactive monomer is preferably from 3 to 40, more preferably from 4 to 35, in particular, preferably from 5 to 30, in view of compatibility with the alkali metal salt. When the average addition mole number is 3 or more, the effect of reducing staining of the protected material tends to be produced efficiently. An average addition mole number of more than 40 is not preferred, because such a mole number may create a tendency to increase interaction with the alkali metal salt so that the pressure-sensitive adhesive composition may form a gel and become difficult to apply. The end of the oxyalkylene chain may be the original hydroxyl group or substituted with any other functional group.

A single alkylene oxide group-containing reactive monomer may be used, or a mixture of two or more alkylene oxide group-containing reactive monomers may be used. The total content of the alkylene oxide group-containing reactive monomer component(s) is preferably 5.0% by weight or less, more preferably 4.0% by weight or less, in particular, preferably 3.0% by weight or less, even more preferably 1.0% by weight or less, based on the amount of the monomer components of the (meth)acryl-based polymer. If the content of the alkylene oxide group-containing reactive monomer is more than 5.0% by weight, the interaction with the alkali metal salt may increase to interfere with ionic conduction, so that the antistatic performance may be undesirably reduced.

In an embodiment of the invention, the oxyalkylene unit of the alkylene oxide group-containing reactive monomer may be one having an alkylene group of 1 to 6 carbon atoms, such as an oxymethylene group, an oxyethylene group, an oxypropylene group, or an oxybutylene group. The hydrocarbon group of the oxyalkylene chain may be a straight or branched chain.

The alkylene oxide group-containing reactive monomer is more preferably an ethylene oxide group-containing reactive monomer. When the (meth)acryl-based polymer used as a base polymer has an ethylene oxide group-containing reactive monomer, the base polymer has improved compatibility with the alkali metal salt, so that the resulting pressure-sensitive adhesive composition is well inhibited from causing bleeding to the adherend and less staining.

In an embodiment of the invention, the alkylene oxide group-containing reactive monomer is typically an alkylene oxide adduct of (meth)acrylic acid or a reactive surfactant having a reactive substituent such as an acryloyl group, a methacryloyl group, or an allyl group in the molecule.

Examples of the alkylene oxide adduct of (meth)acrylic acid include polyethylene glycol(meth)acrylate, polypropylene glycol(meth)acrylate, polyethylene glycol-polypropylene glycol(meth)acrylate, polyethylene glycol-polybutylene glycol(meth)acrylate, polypropylene glycol-polybutylene glycol(meth)acrylate, methoxypolyethylene glycol(meth)acrylate, ethoxypolyethylene glycol(meth)acrylate, butoxypolyethylene glycol(meth)acrylate, octoxypolyethylene glycol(meth)acrylate, lauroxypolyethylene glycol(meth)acrylate, stearoxypolyethylene glycol(meth)acrylate, phenoxypolyethylene glycol(meth)acrylate, methoxypolypropylene glycol(meth)acrylate, and octoxypolyethylene glycol-polypropylene glycol(meth)acrylate.

For example, the reactive surfactant may be a (meth)acryloyl or allyl group-containing, anionic, nonionic, or cationic, reactive surfactant.

Examples of the reactive anionic surfactant include compounds represented by formulae (A1) to (A10).

[Formula 2]

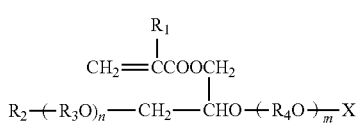

(A1)

In formula (A1), $R_1$ represents hydrogen or a methyl group, $R_2$ represents a hydrocarbon or acyl group of 1 to 30 carbon atoms, X represents an anionic hydrophilic group, $R_3$ and $R_4$ are the same or different and each represent an alkylene group of 1 to 6 carbon atoms, and m and n represent an average addition mole number of 0 to 40, wherein (m+n) is from 3 to 40.

[Formula 3]

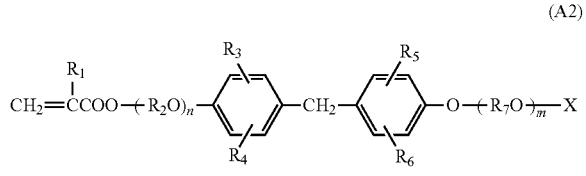

(A2)

In formula (A2), $R_1$ represents hydrogen or a methyl group, $R_2$ and $R_7$ are the same or different and each represent an alkylene group of 1 to 6 carbon atoms, $R_3$ and $R_5$ are the same or different and each represent hydrogen or an alkyl group, $R_4$ and $R_6$ are the same or different and each represent hydrogen, an alkyl group, a benzyl group, or a styrene group, X represents an anionic hydrophilic group, and m and n represent an average addition mole number of 0 to 40, wherein (m+n) is from 3 to 40.

[Formula 4]

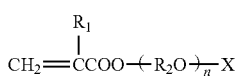

(A3)

In formula (A3), $R_1$ represents hydrogen or a methyl group, $R_2$ represents an alkylene group of 1 to 6 carbon atoms, X represents an anionic hydrophilic group, and n represents an average addition mole number of 3 to 40.

[Formula 5]

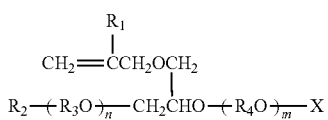

(A4)

In formula (A4), $R_1$ represents hydrogen or a methyl group, $R_2$ represents a hydrocarbon group or an acyl group of 1 to 30 carbon atoms, $R_3$ and $R_4$ are the same or different and each represent an alkylene group of 1 to 6 carbon atoms, X represents an anionic hydrophilic group, and m and n represent an average addition mole number of 0 to 40, wherein (m+n) is from 3 to 40.

[Formula 6]

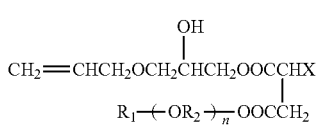

(A5)

In formula (A5), $R_1$ represents a hydrocarbon group, an amino group or a carboxyl group, $R_2$ represents an alkylene group of 1 to 6 carbon atoms, and X represents an anionic hydrophilic group, and n represents an average addition mole number of 3 to 40.

[Formula 7]

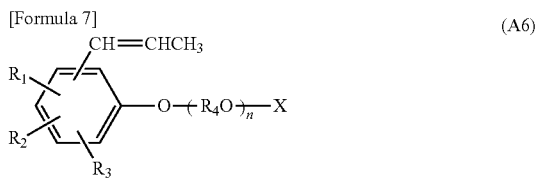
(A6)

In formula (A6), $R_1$ represents a hydrocarbon group of 1 to 30 carbon atoms, $R_2$ represents hydrogen or a hydrocarbon group of 1 to 30 carbon atoms, $R_3$ represents a hydrogen or propenyl group, $R_4$ represents an alkylene group of 1 to 6 carbon atoms, and X represents an anionic hydrophilic group, and n represents an average addition mole number of 3 to 40.

[Formula 8]

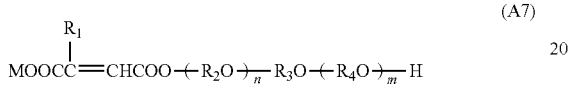
(A7)

In formula (A7), $R_1$ represents hydrogen or a methyl group, $R_2$ and $R_4$ are the same or different and each represent an alkylene group of 1 to 6 carbon atoms, $R_3$ represents a hydrocarbon group of 1 to 30 carbon atoms, M represents hydrogen, an alkali metal, an ammonium group, or an alkanolammonium group, and m and n represent an average addition mole number of 0 to 40, wherein (m+n) is from 3 to 40.

[Formula 9]

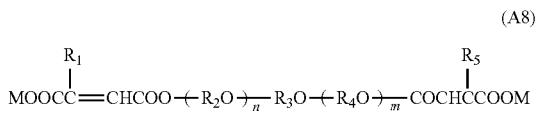
(A8)

In formula (A8), $R_1$ and $R_5$ are the same or different and each represent hydrogen or a methyl group, $R_2$ and $R_4$ are the same or different and each represent an alkylene group of 1 to 6 carbon atoms, $R_3$ represents a hydrocarbon group of 1 to 30 carbon atoms, M represents hydrogen, an alkali metal, an ammonium group, or an alkanolammonium group, and m and n represent an average addition mole number of 0 to 40, wherein (m+n) is from 3 to 40.

[Formula 10]

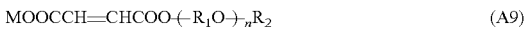
(A9)

In formula (A9), $R_1$ represents an alkylene group of 1 to 6 carbon atoms, $R_2$ represents a hydrocarbon group of 1 to 30 carbon atoms, M represents hydrogen, an alkali metal, an ammonium group, or an alkanolammonium group, and n represents an average addition mole number of 3 to 40.

[Formula 11]

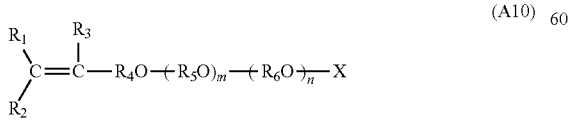
(A10)

In formula (A10), $R_1$, $R_2$ and $R_3$ are the same or different and each represent hydrogen or a methyl group, $R_4$ represents a hydrocarbon group of 0 to 30 carbon atoms (wherein 0 carbon atoms indicate the absence of $R_4$), $R_5$ and $R_6$ are the same or different and each represent an alkylene group of 1 to 6 carbon atoms, X represents an anionic hydrophilic group, and m and n represent an average addition mole number of 0 to 40, wherein (m+n) is from 3 to 40.

X in each of formula (A1) to (A6) and (A10) represents an anionic hydrophilic group. Examples of the anionic hydrophilic group include groups represented by formulae (a1) and (a2) below.

[Formula 12]

$$-SO_3M_1 \quad (a1)$$

In formula (a1), $M_1$ represents hydrogen, an alkali metal, an ammonium group, or an alkanolammonium group.

[Formula 13]

(a2)

In formula (a2), $M_2$ and $M_3$ are the same or different and each represent hydrogen, an alkali metal, an ammonium group, or an alkanolammonium group.

Examples of the reactive nonionic surfactant include compounds represented by formulae (N1) to (N6).

[Formula 14]

(N1)

In formula (N1), $R_1$ represents hydrogen or a methyl group, $R_2$ represents a hydrocarbon or acyl group of 1 to 30 carbon atoms, $R_3$ and $R_4$ are the same or different and each represent an alkylene group of 1 to 6 carbon atoms, and m and n represent an average addition mole number of 0 to 40, wherein (m+n) is from 3 to 40.

[Formula 15]

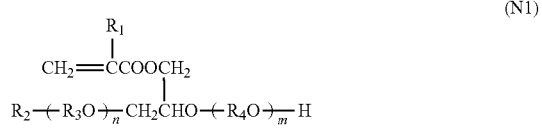
(N2)

In formula (N2), $R_1$ represents hydrogen or a methyl group, $R_2$, $R_3$ and $R_4$ are the same or different and each represent an alkylene group of 1 to 6 carbon atoms, and n, m and l represent an average addition mole number of 0 to 40, wherein (n+m+l) is from 3 to 40.

[Formula 16]

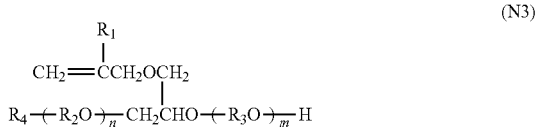
(N3)

In formula (N3), $R_1$ represents hydrogen or a methyl group, $R_2$ and $R_3$ are the same or different and each represent an alkylene group of 1 to 6 carbon atoms, $R_4$ represents a hydrocarbon or acyl group of 1 to 30 carbon atoms, and m and n represent an average addition mole number of 0 to 40, wherein (m+n) is from 3 to 40.

[Formula 17]

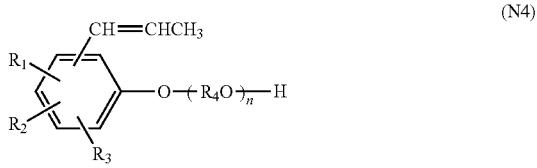
(N4)

In formula (N4), $R_1$ and $R_2$ are the same or different and each represent a hydrocarbon group of 1 to 30 carbon atoms, $R_3$ represents hydrogen or a propenyl group, $R_4$ represents an alkylene group of 1 to 6 carbon atoms, and n represents an average addition mole number of 3 to 40.

[Formula 18]

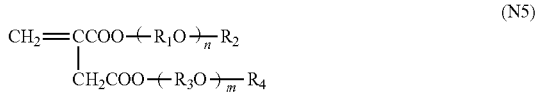
(N5)

In formula (N5), $R_1$ and $R_3$ are the same or different and each represent an alkylene group of 1 to 6 carbon atoms, $R_2$ and $R_4$ are the same or different and each represent hydrogen or a hydrocarbon or acyl group of 1 to 30 carbon atoms, and m and n represent an average addition mole number of 0 to 40, wherein (m+n) is from 3 to 40.

[Formula 19]

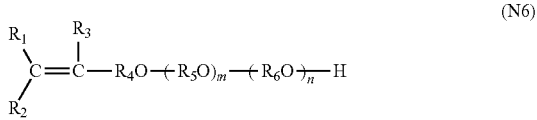
(N6)

In formula (N6), $R_1$, $R_2$ and $R_3$ are the same or different and each represent hydrogen or a methyl group, $R_4$ represents a hydrocarbon group of 0 to 30 carbon atoms (wherein 0 carbon atoms indicate the absence of $R_4$), $R_5$ and $R_6$ are the same or different and each represent an alkylene group of 1 to 6 carbon atoms, and m and n represent an average addition mole number of 0 to 40, wherein (m+n) is from 3 to 40.

Examples of commercially available alkylene oxide group-containing reactive monomers include Blemmer PME-400, Blemmer PME-1000 and Blemmer 50POEP-800B (each manufactured by Nippon Oil & Fats Co., Ltd.), Latemul PD-420 and Latemul PD-430 (each manufactured by Kao Corporation), and Adekariasoap ER-10 and Adekariasoap NE-10 (each manufactured by Asahi Denka Kogyo K. K.).

The acrylic polymer for use in the present invention preferably has a weight average molecular weight of 100,000 to 5,000,000, more preferably of 200,000 to 4,000,000, still more preferably of 300,000 to 3,000,000. If the weight average molecular weight is less than 100,000, the cohesive strength of the pressure-sensitive adhesive composition can be so low that pressure-sensitive adhesive deposition can tend to occur. If the weight average molecular weight is more than 5,000,000, the flowability of the polymer can be reduced so that wetting of polarizing plates can be insufficient, which can tend to cause peeling. The weight-average molecular weight is a molecular weight obtained by measurement by GPC (gel permeation chromatography).

The (meth)acryl-based polymer preferably has a glass transition temperature (Tg) of 0° C. or lower, more preferably –10° C. or lower. When the glass transition temperature is higher than 0° C., the polymer may have low fluidity and insufficiently wet a polarizing plate, which may tend to cause bulging between the polarizing plate and the pressure-sensitive adhesive composition layer of a pressure-sensitive adhesive sheet. The glass transition temperature (Tg) of the (meth) acryl-based polymer can be controlled within the range by appropriately changing the monomer components to be used or the composition ratio.

The production of the (meth)acryl-based polymer is not particularly limited, for example, a known radical polymerization method can be appropriately selected, examples thereof including solution polymerization, emulsion polymerization, bulk polymerization, and suspension polymerization. The resultant polymer may be any one selected from a random copolymer, a block copolymer, an alternate copolymer, a graft copolymer and others.

The pressure-sensitive adhesive composition of the invention contains an alkali metal salt in addition to the (meth) acryl-based polymer and an organopolysiloxane having a polyoxyalkylene side chain. Based on 100 parts by weight of the (meth)acryl-based polymer, the total amount of the alkali metal salt and the organopolysiloxane is from 0.15 to 4 parts by weight, preferably from 0.2 to 3 parts by weight, more preferably from 0.2 to 2 parts by weight, even more preferably from 0.2 to 1.5 parts by weight. The above range is preferred, because antistatic properties and low staining properties are easily achieved at the same time within the above range.

The content ratio of the alkali metal salt to the organopolysiloxane by weight is preferably from 20:80 to 50:50, more preferably from 25:75 to 45:55, even more preferably from 30:70 to 40:60, in particular, preferably 30:70. If the ratio is less than 20:80, sufficient antistatic properties may fail to be obtained, and if the ratio is more than 50:50, a rise in viscosity tends to make it difficult to control an antistatic solution.

The alkali metal salt for use in the present invention may be used is composed of a cation of $Li^+$, $Na^+$ or $K^+$ and an anion of $Cl^-$, $Br^-$, $I^-$, $BF_4^-$, $PF_6^-$, $SCN^-$, $ClO_4^-$, $CF_3SO_3^-$, $(CF_3SO_2)_2N^-$, $(C_2F_5SO_2)_2N^-$, or $(CF_3SO_2)_3C^-$. In particular, lithium salts such as LiBr, LiI, $LiBF_1$, $LiPF_6$, LiSCN, $LiClO_4$, $LiCF_3SO_3$, $Li(CF_3SO_2)_2N$, $Li(C_2F_5SO_2)_2N$, and $Li(CF_3SO_2)_3$ are preferably used. One or more of these alkali metal salts may be used singly or in combination.

As for the content of the alkali metal salt used in the pressure-sensitive adhesive composition, for example, when the content ratio of the alkali metal salt to the organopolysiloxane is 20:80 by weight, the alkali metal salt is preferably added in an amount of 0.03 to 0.8 parts by weight, more preferably 0.04 to 0.6 parts by weight, even more preferably 0.04 to 0.4 parts by weight, in particular, preferably 0.04 to 0.3 parts by weight, based on 100 parts by weight of the (meth)acryl-based polymer. If it is less than 0.03 parts by weight, sufficient antistatic properties may fail to be obtained, and if it is more than 0.8 parts by weight, staining will tend to occur, which is not preferred.

For example, when the content ratio of the alkali metal salt to the organopolysiloxane is 50:50 by weight, the alkali metal salt is preferably added in an amount of 0.075 to 2.0 parts by weight, more preferably 0.1 to 1.5 parts by weight, even more preferably 0.1 to 1.0 parts by weight, in particular, preferably 0.1 to 0.75 parts by weight, based on 100 parts by weight of the (meth)acryl-based polymer. If it is less than 0.075 parts by weight, sufficient antistatic properties may fail to be obtained, and if it is more than 2.0 parts by weight, staining will tend to occur, which is not preferred.

For example, when the content ratio of the alkali metal salt to the organopolysiloxane is 30:70 by weight, the alkali metal salt is preferably added in an amount of 0.045 to 1.2 parts by weight, more preferably 0.06 to 0.9 parts by weight, even more preferably 0.06 to 0.6 parts by weight, in particular, preferably 0.06 to 0.45 parts by weight, based on 100 parts by weight of the (meth)acryl-based polymer. If it is less than 0.045 parts by weight, sufficient antistatic properties may fail to be obtained, and if it is more than 1.2 parts by weight, staining will tend to occur, which is not preferred.

The organopolysiloxane used in the pressure-sensitive adhesive composition is preferably represented by the formula shown below, while any appropriate known organopolysiloxane having a polyoxyalkylene side chain may be used.

[Formula 20]

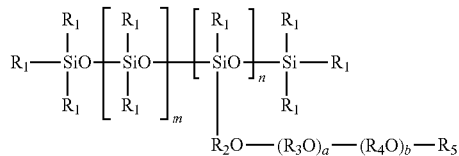

wherein $R_1$ represents a monovalent organic group, $R_2$, $R_3$, and $R_4$ each represent an alkylene group, or $R_5$ represents a hydroxyl group or an organic group, m and n each represent an integer of 0 to 1,000, provided that m and n are not simultaneously 0, and a and b each represent an integer of 0 to 100, provided that a and b are not simultaneously 0.

The organopolysiloxane more preferably has a hydroxyl group at the end of the polyoxyalkylene side chain. Using the organopolysiloxane, antistatic properties are effectively imparted to the protected material.

As for the content of the organopolysiloxane, for example, when the content ratio of the alkali metal salt to the organopolysiloxane is 20:80 by weight, the organopolysiloxane is preferably added in an amount of 0.12 to 3.2 parts by weight, more preferably 0.16 to 2.4 parts by weight, even more preferably 0.16 to 1.6 parts by weight, in particular, preferably 0.16 to 1.2 parts by weight, based on 100 parts by weight of the (meth)acryl-based polymer. If it is less than 0.12 parts by weight, sufficient antistatic properties may fail to be obtained, and if it is more than 3.2 parts by weight, staining will tend to occur, which is not preferred.

For example, when the content ratio of the alkali metal salt to the organopolysiloxane is 50:50 by weight, the organopolysiloxane is preferably added in an amount of 0.075 to 2.0 parts by weight, more preferably 0.1 to 1.5 parts by weight, even more preferably 0.1 to 1.0 part by weight, in particular, preferably 0.1 to 0.75 parts by weight, based on 100 parts by weight of the (meth)acryl-based polymer. If it is less than 0.075 parts by weight, sufficient antistatic properties may fail to be obtained, and if it is more than 2.0 parts by weight, staining will tend to occur, which is not preferred.

For example, when the content ratio of the alkali metal salt to the organopolysiloxane is 30:70 by weight, the organopolysiloxane is preferably added in an amount of 0.105 to 2.8 parts by weight, more preferably 0.14 to 2.1 parts by weight, even more preferably 0.14 to 1.4 parts by weight, in particular, preferably 0.14 to 1.05 parts by weight, based on 100 parts by weight of the (meth)acryl-based polymer. If it is less than 0.105 parts by weight, sufficient antistatic properties may fail to be obtained, and if it is more than 2.8 parts by weight, staining will tend to occur, which is not preferred.

In an embodiment of the invention, the organopolysiloxane to be used may typically have the structure as shown below. In the formula, specifically, $R_1$ represents a monovalent organic group typified by an alkyl group such as methyl, ethyl, or propyl, an aryl group such as phenyl or tolyl, or an alkyl group such as benzyl or phenethyl, which may each have a substituent such as a hydroxyl group. $R_2$, $R_3$, and $R_4$ may represent a methylene group, an ethylene group, a propylene group, or any other alkylene group of 1 to 8 carbon atoms. In the formula, $R_3$ and $R_4$ should represent different alkylene groups, and $R_2$ may be the same as or different from $R_3$ or $R_4$. Any one of $R_3$ and $R_4$ preferably represents an ethylene or propylene group so that the concentration of the alkali metal salt soluble in the polyoxyalkylene side chain can be increased. $R_5$ may represent a monovalent organic group typified by an alkyl group such as methyl, ethyl, or propyl, or an acyl group such as acetyl or propionyl, which may each have a substituent such as a hydroxyl group. These compounds may be used alone or in a mixture of two or more. The organopolysiloxane may also have a reactive substituent such as a (meth)acryloyl, allyl, or hydroxyl group. In particular, the organopolysiloxane having a polyoxyalkylene side chain is preferably an organopolysiloxane having a hydroxyl-terminated polyoxyalkylene side chain, because compatibility balance is considered to be easily achieved.

[Formula 21]

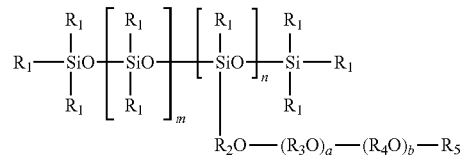

Examples of the organopolysiloxane include commercially available products such as KF-351A, KF-353, KF-945, KF-6011, KF-889, and KF-6004 (all manufactured by Shin-Etsu Chemical Co., Ltd.), FZ-2122, FZ-2164, FZ-7001, SH8400, SH8700, SF8410, and SF8422 (all manufactured by Dow Corning Toray Co., Ltd.), TSF-4440, TSF-4445, TSF-4452, and TSF-4460 (manufactured by Momentive Performance Materials Inc.), and BYK-333, BYK-377, BYK-UV3500, and BYK-UV3570 (manufactured by BYK Japan KK). These compounds may be used alone or in a mixture of two or more.

The pressure-sensitive adhesive layer of the invention is preferably produced by crosslinking the pressure-sensitive adhesive composition. Selection of the structural units and component ratio of the (meth)acryl-based polymer, selection of the crosslinking agent, appropriate control of the addition ratio of the crosslinking agent, and crosslinking make it possible to obtain a pressure-sensitive adhesive sheet with better heat resistance.

The crosslinking agent for use in an embodiment of the invention may be an isocyanate compound, an epoxy compound, a melamine resin, an aziridine derivative, a metal chelate compound, or the like. In particular, an isocyanate compound or an epoxy compound is preferably used mainly in terms of obtaining an adequate level of cohesive strength. These compounds may be used alone or in a mixture of two or more.

Examples of the isocyanate include lower aliphatic polyisocyanates such as butylenediisocyanate and hexamethylenediisocyanate, alicyclic isocyanates such as cyclopentylenediisocyanate, cyclohexylenediisocyanate and isophoronediisocyanate, aromatic isocyanates such as 2,4-tolylenediisocyanate, 4,4'-diphenylmethanediisocyanate and xylylenediisocyanate, a trimethylolpropane/tolylenediisocyanate trimer adduct (trade name: Coronate L, manufactured by Nippon Polyurethane Industry Co., Ltd.), a trimethylolpropane/hexamethylenediisocyanate trimer adduct (trade name: Coronate HL, manufactured by Nippon Polyurethane Industry Co., Ltd.), an isocyanate adducts such as an isocyanurate of hexamethylenediisocyanate (trade name: Coronate HX, manufactured by Nippon Polyurethane Industry Co., Ltd.). One or more of these compounds may be used singly or in combination.

Examples of epoxy compounds include N,N,N',N'-tetraglycidyl-m-xylenediamine (trade name: Tetrad-X, manufactured by Mitsubishi Gas Chemical Company, Inc.) and 1,3-bis(N,N-diglycidylaminomethyl)cyclohexane (trade name: Tetrad-C, manufactured by Mitsubishi Gas Chemical Company, Inc.). One or more of these compounds may be used singly or in combination.

The melamine resin may be a hexamethylolmelamine. One or more melamine resins may be used singly or in combination. Examples of the aziridine derivative include a commercially available product trade named HDU (manufactured by Sogo Pharmaceutical Co., Ltd.), that trade named TAZM (manufactured by Sogo Pharmaceutical Co., Ltd.), and that trade named TAZO (manufactured by Sogo Pharmaceutical Co., Ltd.). These compounds may be used or may be used in combination.

Metal chelate compounds include a metal component such as aluminum, iron, tin, titanium, or nickel, and a chelate component such as acetylene, methyl acetoacetate, or ethyl lactate. These compounds may be used alone or in a mixture of two or more.

The content of the crosslinking agent used in an embodiment of the invention is preferably from 0.01 to 15 parts by weight, more preferably from 0.5 to 10 parts by weight, based on 100 parts by weight of the (meth)acryl-based polymer. If the content is less than 0.01 parts by weight, the crosslinking agent may insufficiently form a crosslink, so that the cohesive strength of the pressure-sensitive adhesive composition may be low, which may make it impossible to obtain sufficient heat resistance or tend to cause adhesive deposit. On the other hand, if the content is more than 15 parts by weight, the polymer may have a high cohesive strength to reduce fluidity, so that the wettability on a polarizing plate may be insufficient, which may tend to cause bulging between the polarizing plate and the pressure-sensitive adhesive composition layer. These crosslinking agents may be used alone or in a mixture of two or more.

In an embodiment of the present invention, a polyfunctional monomer having two or more radiation-reactive unsaturated bonds may be added as a crosslinking agent to the pressure-sensitive adhesive composition. In this case, the pressure-sensitive adhesive composition may be crosslinked by application of radiations. A single molecule of the polyfunctional monomer may have two or more radiation-reactive unsaturated bonds derived from one or more radiation-crosslinkable (curable) moieties such as vinyl, acryloyl, methacryloyl, and vinylbenzyl groups. The polyfunctional monomer that may be preferably used generally has 10 or less radiation-reactive unsaturated bonds. One or more of these compounds may be used singly or in combination.

Examples of the polyfunctional monomer include ethylene glycol di(meth)acrylate, diethylene glycol di(meth)acrylate, tetraethylene glycol di(meth)acrylate, neopentylglycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

The amount of the addition of the polyfunctional monomer may be appropriately selected depending on the balance with the (meth)acrylic polymer to be crosslinked and the use of the pressure-sensitive adhesive sheet. In order to achieve sufficient heat resistance based on the cohesive strength of the acrylic pressure-sensitive adhesive, 0.1 to 30 parts by weight of the polyfunctional monomer is preferably blended, based on 100 parts by weight of the (meth)acrylic polymer. In view of flexibility and adhesive property, 10 parts by weight or less of the polyfunctional monomer is preferably blended, based on 100 parts by weight of the (meth)acrylic polymer.

Examples of radiations include ultraviolet rays, laser beams, a rays, p rays, y rays, X rays, and electron beams. Ultraviolet rays are preferably used, because of their good controllability or handleability. Ultraviolet rays with a wavelength of 200 to 400 nm are more preferably used. Ultraviolet rays may be applied using any appropriate light source such as a high pressure mercury lamp, a microwave-excited lamp and a chemical lamp. When ultraviolet rays are used as radiations, a photopolymerization initiator should be added to the acrylic pressure-sensitive adhesive.

The photopolymerization initiator may be any material that can produce a radical or a cation, depending on the type of the radiation-reactive component, when ultraviolet rays with an appropriate wavelength capable of inducing the polymerization reaction are applied.

Examples of photoradical polymerization initiators include benzoins such as benzoin, benzoin methyl ether, benzoin ethyl ether, methyl o-benzoylbenzoate-p-benzoin ethyl ether, benzoin isopropyl ether, and α-methylbenzoin; acetophenes such as benzyldimethylketal, trichloroacetophenone, 2,2-diethoxyacetophenone, and 1-hydroxycyclohexyl phenyl ketone; propiophenones such as 2-hydroxy-2-methylpropiophenone and 2-hydroxy-4'-isopropyl-2-methylpropiophenone; benzophenones such as benzophenone, methylbenzophenone, p-chlorobenzophenone, and p-dimethylaminobenzophenone; thioxanthons such as 2-chlorothioxanthon, 2-ethylthioxanthon and 2-isopropylthioxanthon; acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide; and benzil, dibenzsuberone and α-acyloxime ester. One or more of these compounds may be used singly or in combination.

Examples of photocation polymerization initiators include onium salts such as aromatic diazonium salts, aromatic iodonium salts and aromatic sulfonium salts; organometallic complexes such as iron-allene complexes, titanocene complexes and aryl silanol-aluminum complexes; and nitrobenzyl esters, sulfonic acid derivatives, phosphoric acid esters, phenolsulfonic acid esters, diazonaphthoquinone, and N-hydroxyimidosulfonate. One or more of these compounds may be used singly or in combination.

Preferably 0.1 to 10 parts by weight, more preferably 0.2 to 7 parts by weight of the photopolymerization initiatior is blended, based on 100 parts by weight of the (meth)acrylic polymer. The above range is preferred, because within the above range, the polymerization reaction can be easily controlled so that a suitable molecular weight can be obtained.

Photo-initiated polymerization aids such as amines may also be used in combination with the initiator. Examples of such photoinitiation aids include 2-dimethylaminoethyl benzoate, dimethylaminoacetophenone, ethyl p-dimethylaminobenzoate, and isoamyl p-dimethylaminobenzoate. One or more of these compounds may be used singly or in combination. Preferably 0.05 to 10 parts by weight, more preferably 0.1 to 7 parts by weight of the polymerization initiation aid is blended, based on 100 parts by weight of the (meth)acrylic polymer. The above range is preferred, because within the above range, the polymerization reaction can be easily controlled so that a suitable molecular weight can be obtained.

When a photopolymerization initiator as an optional component is added as described above, the pressure-sensitive adhesive composition may be applied directly onto the material to be protected or applied to one or both sides of a backing and then irradiated with light so that a pressure-sensitive adhesive layer can be obtained. In general, the pressure-sensitive adhesive layer is obtained by photopolymerization in which ultraviolet light with a wavelength of 300 to 400 nm and an illuminance of 1 to 200 mW/cm$^2$ is applied at a dose of about 200 to about 4,000 mJ/cm$^2$.

Further, the pressure-sensitive adhesive composition used the pressure-sensitive adhesive sheet of the present invention may contain other known additives, for example, a coloring agent, a pigment, other powder, a surfactant agent, a plasticizer, a tackifier, a low-molecular-weight polymer, a surface lubricant agent, a leveling agent, an antioxidant, a corrosion preventing agent, a photo stabilizer, an ultraviolet absorbing agent, a polymerization inhibitor, a silane coupling agent, and an inorganic or an organic filler, metal powder, granules, foils, and others, which may be added to the pressure-sensitive adhesive composition used in the pressure-sensitive adhesive sheet of the present invention depending on utility.

The pressure-sensitive adhesive sheet of the invention preferably includes a backing film and a pressure-sensitive adhesive layer that is formed on one or both sides of the backing film by crosslinking any one of the pressure-sensitive adhesive compositions described above. The pressure-sensitive adhesive sheet of the invention, which has the pressure-sensitive adhesive layer formed by crosslinking the pressure-sensitive adhesive composition with the advantageous effects described above, can prevent electrification of the non-antistatic protected material, when peeled off, and is reduced in the risk of staining the protected material. Therefore, it is very useful as an antistatic pressure-sensitive adhesive sheet in technical fields related to optical and electronic components, where electrification and staining can cause particularly serious problems.

The pressure-sensitive adhesive sheet of the invention is produced by forming the pressure-sensitive adhesive layer on a backing film. In this process, the pressure-sensitive adhesive composition is generally crosslinked after the application of the pressure-sensitive adhesive composition. Alternatively, however, a pressure-sensitive adhesive layer made of the crosslinked pressure-sensitive adhesive composition may be transferred to a backing film or the like.

The pressure-sensitive adhesive layer may be formed on the backing film by any appropriate method. For example, the pressure-sensitive adhesive layer is formed on the backing film by a process including applying the pressure-sensitive adhesive composition to the backing film and removing the polymerization solvent by drying. Subsequently, aging may be performed for a purpose such as control of migration of the components of the pressure-sensitive adhesive layer or control of the crosslinking reaction. When the pressure-sensitive adhesive composition is applied to the backing film to form a pressure-sensitive adhesive sheet, one or more solvents other than the polymerization solvent may also newly added to the composition so that the composition can be uniformly applied to the backing film.

When the pressure-sensitive adhesive sheet of the invention is manufactured, known methods which have been used in manufacturing pressure-sensitive adhesive tapes may be used to form the pressure-sensitive adhesive layer. Specific examples thereof include roll coating, gravure coating, reverse coating, roll blush, spray coating, air knife coating, and extrusion coating using a die coater.

Pressure-sensitive adhesive sheets of the present invention are formed such that the thickness of aforementioned pressure-sensitive adhesive layer is usually 3 to 100 μm, preferably around 5 to 50 μm. When the pressure-sensitive adhesive layer has a thickness in the above range, moderate balance of removability and adhesive property can be obtained, which is preferred. The pressure-sensitive adhesive sheets are such that the aforementioned pressure-sensitive adhesive layer is coated on one side or both sides of various backing films comprising a plastic film such as a polyester film, or a porous material such as a paper and a non-woven fabric to form an aspect of a sheet or a tape.

The backing film used to form the pressure-sensitive adhesive sheet of the invention, which is produced with the pressure-sensitive adhesive composition of the invention, generally has a thickness of about 5 to about 200 μm, preferably about 10 to about 100 μm. When the backing film has a thickness in the above range, good workability can be obtained in bonding to the adherend and in peeling from the adherend, which is preferred.

The backing film may be subjected to releasing, or anti-staining treatment with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In the pressure-sensitive adhesive sheet of the invention, the pressure-sensitive adhesive layer used to form the pressure-sensitive adhesive sheet preferably has a 180° peel adhesion (at a tensile speed of 0.3 m/minute) of 0.25 N/25 mm or less, more preferably 0.01 to 0.2 N/25 mm, even more preferably 0.03 to 0.15 N/25 mm, to a polarizing plate at 23° C. and 50% RH. If the peel adhesion is less than 0.01 N/25 mm (at a tensile speed of 0.3 m/minute), the sheet may easily peel off even in other processes than the peeling-off process, which is not preferred. If it is more than 0.25 N/25 mm, the peeling workability may be low when the sheet becomes unnecessary, which is not preferred.

The 180° peel adhesion to a polarizing plate at 23° C. and 50% RH (at a tensile speed of 30 m/minute) is preferably 3.0 N/25 mm or less, more preferably from 0.1 to 2.5 N/25 mm, in particular, preferably from 0.2 to 2.0 N/25 mm. If the peel adhesion (at a tensile speed of 30 m/minute) is less than 0.1 N/25 mm, the sheet may easily peel off even in other processes than the peeling-off process, which is not preferred. If it is more than 3.0 N/25 mm, the peeling workability may be low when the sheet becomes unnecessary, so that the adherend may be damaged by the peeling process, which is not preferred.

When the pressure-sensitive adhesive sheet of the invention is used as a surface protecting film, the pressure-sensitive adhesive layer is preferably formed on one or both sides of the backing film, and the backing film is preferably an antistatic-treated plastic film. Using such a backing film, electrification of the surface protecting film itself can be prevented during peeling, which is preferred. The pressure-sensitive adhesive sheet of the invention, which has a pressure-sensitive adhesive layer produced by crosslinking the pressure-sensitive adhesive composition having the above advantageous effects, can form a surface protecting film that prevents electrification of the non-antistatic protected material, when peeled off, and is reduced in the risk of staining the protected material. Therefore, it is very useful as an antistatic surface protecting film in technical fields related to optical and electronic components, where electrification and staining can cause particularly serious problems. Also when the backing film is a plastic film which undergoes an antistatic treatment, electrification of the surface protecting film itself is reduced, and the resulting product has high antistatic performance on the protected material.

The backing film is preferably a plastic film having heat resistance, solvent resistance, and flexibility. When the backing film has flexibility, the pressure-sensitive adhesive composition can be applied using a roll coater or the like, and the product can be wound into a roll.

The plastic film is not particularly limited as far as it can be formed into a sheet or a film, and examples include a polyolefin film such as polyethylene, polypropylene, poly-1-butene, poly-4-methyl-1-pentene, an ethylene.propylene copolymer, an ethylene.1-butene copolymer, an ethylene.vinyl acetate copolymer, an ethylene.ethyl acrylate copolymer, and an ethylene.vinyl alcohol copolymer, a polyester film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a polyvinylidene chloride film, and a polycarbonate film.

In an embodiment of the invention, antistatic treatment which is performed on a plastic substrate is not particularly limited, but for example, a method of providing an electrification preventing layer on at least one side of a generally used film, or a method of kneading a kneading-type electrification preventing agent into a plastic film is used. Examples of a method of providing an electrification preventing layer on at least one side of a film include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as aminoalcohol and a derivative, glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, acyloylamidopropyltrimethylammonium methosulfate, an alkylbenzylmethylammonium salt, acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetaingrafted copolymer. These compounds may be used alone, or two or more kinds may be used by mixing.

Examples of the nonion-type electrification preventing agent include fatty acid alkylolamide, di(2-hydroxyethyl)alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol(meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melamine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method, and an extrusion coating method with a die coater.

A thickness of the aforementioned electrification preventing resin layer, electrically conductive polymer or electrically conductive resin is usually 0.01 to 5 μm, preferably around 0.03 to 1 μm. Within the above range, the plastic film is less likely to degrade in heat resistance, solvent resistance, and flexibility, which is preferred.

Examples of a method of depositing or plating an electrically conductive substance include vacuum deposition, sputtering, ion plating, chemical deposition, spray pyrolysis, chemical plating, and electric plating methods.

The thickness of the electrically-conductive material layer is generally from 0.002 to 1 μm, preferably from 0.005 to 0.5 μm. Within the above range, the plastic film is less likely to degrade in heat resistance, solvent resistance, and flexibility, which is preferred.

As the kneading-type electrification preventing agent, the aforementioned electrification preventing agent is appropriately used. An amount of the kneading-type electrification preventing agent to be blended is 20% by weight or less, preferably in a range of 0.05 to 10% by weight relative to a total weight of a plastic film. Within the above range, the plastic film is less likely to degrade in heat resistance, solvent resistance, and flexibility, which is preferred. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

If necessary in the pressure sensitive adhesive sheet and the surface protecting film of the present invention, a separator can be laminated on a surface of a pressure-sensitive adhesive layer for the purpose of protecting a pressure-sensitive adhesive surface.

The material used to form the separator may be paper or a plastic film. A plastic film is preferably used because of its good surface smoothness. Such a film may be of any type capable of protecting the pressure-sensitive adhesive layer, examples of which include a polyethylene film, a polypropylene film, a polybutene film, a polybutadiene film, a polymethylpentene film, a polyvinyl chloride film, a vinyl chloride copolymer film, polyethylene terephthalate film, a polybutylene terephthalate film, a polyurethane film, and an ethylene-vinyl acetate copolymer film.

The separator generally has a thickness of about 5 to about 200 μm, preferably about 10 to about 100 μm. Within the above range, good workability can be obtained in bonding to the pressure-sensitive adhesive layer and in peeling from the pressure-sensitive adhesive layer, which is preferred. If necessary, the separator may be subjected to release and antifouling treatment with a silicone, fluoride, long-chain alkyl, or fatty acid amide release agent or silica powder or subjected to antistatic treatment of coating type, kneading type, vapor-deposition type, or the like.

In the surface protecting film of the invention, the pressure-sensitive adhesive layer used to form the surface protecting film preferably has a 180° peel adhesion (at a tensile speed of 0.3 m/minute) of 0.25 N/25 mm or less, more preferably 0.01 to 0.2 N/25 mm, even more preferably 0.03 to 0.15 N/25 mm, to a polarizing plate at 23° C. and 50% RH. If the peel adhesion is less than 0.01 N/25 mm (at a tensile speed of 0.3 m/minute), the protecting tape may easily peel off from the adherend even in other processes than the peeling-off process, so that the function of protecting the adherend may be lost, which is not preferred. If it is more than 0.25 N/25 mm, the protecting tape may be difficult to peel off from the adherend, so that the peeling workability may be low when the protecting tape becomes unnecessary, which is not preferred.

The 180° peel adhesion to a polarizing plate at 23° C. and 50% RH (at a tensile speed of 30 m/minute) is preferably 3.0 N/25 mm or less, more preferably from 0.1 to 2.5 N/25 mm, in particular, preferably from 0.2 to 2.0 N/25 mm. If the peel adhesion (at a tensile speed of 30 m/minute) is less than 0.1 N/25 mm, the protecting tape may easily peel off from the adherend even in other processes than the peeling-off process, so that the function of protecting the adherend may be lost, which is not preferred. If it is more than 3.0 N/25 mm, the protecting tape may be difficult to peel off from the adherend, so that the peeling workability may be low when the protecting tape becomes unnecessary and that the adherend may be damaged by the peeling process, which is not preferred.

The pressure-sensitive adhesive composition, the pressure-sensitive adhesive layer, and the pressure-sensitive adhesive sheet (including the surface protecting film or the like) according to the invention are particularly used in plastic products and other products vulnerable to static electricity. Therefore, they are very useful to prevent static build-up in technical fields related to optical and electronic components, where electrification can cause a particularly serious problem.

EXAMPLES

Hereinafter, examples and others are described to show the features and effects of the invention specifically, but they are not intended to limit the invention. The evaluation items in the examples and so on were determined as described below.

<Measurement of Acid Value>

An acid value was measured using an automatically titrating apparatus (COM-550 manufactured by HIRANUMA SANGYO Co., Ltd.), and was obtained by the following equation.

$$A = \{(Y-X) \times f \times 5.611\}/M$$

A: Acid value
Y: Titration amount of sample solution (ml)
X: Titration amount of solution of only 50 g of mixed solvent (ml)
F: Factor of titration solution
M: Weight of polymer sample (g)

Measurement conditions are as follows: Sample solution: About 0.5 g of a polymer sample was dissolved in 50 g of a mixed solvent (toluene/2-propanol/distilled water=50/49.5/0.5, weight ratio) to obtain a sample solution.

Titration solution: 0.1N 2-propanolic potassium hydroxide solution (for petroleum product neutralization value test manufactured by Wako Pure Chemical Industries, Ltd.)

Electrode: glass electrode; GE-101, comparative electrode; RE-201,
Measurement mode: petroleum product neutralization value test 1

<Measurement of Molecular Weight>

The weight average molecular weight was measured using a GPC system (HLC-8220GPC manufactured by Tosoh Corporation). The measurement conditions were as follows.
Sample concentration: 0.2% by weight (a THF solution)
Sample injection amount: 10 μl
Eluent: THF
Flow rate: 0.6 ml/min
Measurement temperature: 40° C.
Columns: TSK guard column Super HZ-H (one)+TSK gel Super HZM-H (two) as sample columns, TSK gel Super H-RC (one) as a reference column
Detector: Refractive index detector (RI)
The weight average molecular weight was determined as a polystyrene-equivalent molecular weight.

<Theoretical Value of Glass Transition Temperature>

The glass transition temperature Tg (° C.) was calculated from the formula below using the glass transition temperature Tgn (° C.) of the homopolymer of each monomer and the literature data shown below.

$$(Tg+273)=\Sigma[Wn/(Tgn+273)]$$ Formula 1/ wherein Tg (° C.) represents the glass transition temperature of a copolymer, Wn (–) represents the weight fraction of each monomer, Tgn (° C.) represents the glass transition temperature of the homopolymer of each monomer, and n represents each monomer species.
Literature data:
2-ethylhexyl acrylate: –70° C.
2-hydroxyethyl acrylate: –15° C.
Acrylic acid: 106° C.
For the literature data, reference was made to "Acryl Jushi no Gosei Sekkei to Shin-Yoto Tenkai (Synthesis/Design of Acrylic Resins and Development of New Applications) (published by Chuo Keiei Kaihatsu Center Shuppan-bu).

<Measurement of Glass Transition Temperature>

The glass transition temperature (Tg) (° C.) was determined with a dynamic viscoelasticity measurement system (ARES manufactured by Rheometric Scientific Inc.) by the method described below.

An about 2 mm-thick laminate of (meth)acrylic polymer sheets (each with a thickness of 20 μm) was prepared and stamped into 7.9 mmφ pieces. The resulting cylindrical pellets were used as samples for glass transition temperature measurement.

The sample was fixed on a 7.9 mmφ parallel plate tool and measured for the temperature dependence of the loss modulus G" in the dynamic viscoelasticity measurement system. The temperature at which the resulting G" curve was maximal was defined as the glass transition temperature (° C.).
The measurement conditions were as follows:
Measurement: shear mode
Temperature range: –70° C.~150° C.
Rate of temperature increase: 5° C./min
Frequency: 1 Hz.

<Measurement of Peeling Electrification Voltage>

The pressure-sensitive adhesive sheet was cut into a piece with a size of 70 mm in width and 130 mm in length, and the separator was peeled off. Using a hand roller, the piece was then press-bonded to the surface of a TAC polarizing plate or an AG polarizing plate (SEG1425DU Polarizing Plate or AGS1 Polarizing Plate manufactured by NITTO DENKO CORPORATION, 70 mm in width, 100 mm in length), which had been bonded to an acrylic plate (2 mm in thickness, 70 mm in width, 100 mm in length) having undergone static elimination in advance, in such a manner that one end of the piece protruded 30 mm out of the plate.

The resulting sample was allowed to stand at 23° C. and 50% RH for a day and then set at the predetermined location as shown in FIG. 1. The one end protruding 30 mm was fixed to an automatic winder, and the piece was peeled off at a peel angle of 150° and a peel rate of 30 m/minute. The potential generated on the surface of the polarizing plate in this process was measured using a potential meter (KSD-0103 manufactured by KASUGA ELECTRIC WORKS LTD.) fixed above the center of the polarizing plate. The measurement was performed in an environment at 23° C. and 50% RH.

<Evaluation of Staining Properties>

The prepared pressure-sensitive adhesive sheet was cut into a piece with a size of 50 mm in width and 80 mm in length, and the separator was peeled off. The piece was then laminated to a 70 mm wide, 100 mm long, cut piece of a TAC polarizing plate or an AG polarizing plate (SEG1425DU Polarizing Plate or AGS1 Polarizing Plate manufactured by NITTO DENKO CORPORATION, 70 mm in width, 100 mm in length) under a pressure of 0.25 MPa at a rate of 0.3 m/minute, so that an evaluation sample was obtained.

After the evaluation sample was allowed to stand at 23° C. and 50% RH for a day, the pressure-sensitive adhesive sheet was peeled off from the adherend by hand, while whether and how the surface of the adherend was stained was visually observed in comparison with the adherend with no evaluation sample bonded thereto. The evaluation criteria were as follows.
O: Cases where no staining was observed.
X: Cases where staining was observed.

<Measurement of Adhesive Power>

A TAC polarizing plate or an AGS1 polarizing plate (SEG1425DU Polarizing Plate or AGS1 Polarizing Plate manufactured by NITTO DENKO CORPORATION, 70 mm in width, 100 mm in length) was allowed to stand in an environment at 23° C. and 50% RH for 24 hours, and then a 25 mm wide, 100 mm long, cut piece of the pressure-sensitive adhesive sheet was laminated to the above object under a pressure of 0.25 MPa at a rate of 0.3 m/minute, so that an evaluation sample was obtained.

After the lamination, the sample was allowed to stand in an environment at 23° C. and 50% RH for 30 minutes, and then using a universal tensile tester, the adhesive power was measured when the sheet was peeled off at a peel rate of 0.3 m/minute or 30 m/minute and a peel angle of 180°. The measurement was performed in an environment at 23° C. and 50% RH.

<Preparation of (Meth)acryl-Based Polymers>

[Acryl-Based Polymer (A)]

To a four-neck flask equipped with a stirring blade, a thermometer, a nitrogen gas introducing tube, and a condenser were added 200 parts by weight of 2-ethylhexyl acrylate, 8 parts by weight of 2-hydroxyethyl acrylate, 0.4 parts by weight of 2,2'-azobisisobutyronitrile as a polymerization initiator, and 312 parts by weight of ethyl acetate. While the mixture was gently stirred, nitrogen gas was introduced, and a polymerization reaction was performed for 6 hours, while the temperature of the liquid in the flask was kept at about 65° C., so that an acryl-based polymer (A) solution (40% by weight) was prepared. The acryl-based polymer (A) had a weight average molecular weight of 540,000, a theoretical glass transition temperature (Tg) of –68° C., a measured Tg of –55°, and an acid value of 0.0.

[Acryl-Based Polymer (B)]

To a four-neck flask equipped with a stirring blade, a thermometer, a nitrogen gas introducing tube, a condenser, and a dropping funnel were added 199 parts by weight of 2-ethylhexyl acrylate, 1 part by weight of a reactive surfactant (LATEMUL PD-420 manufactured by Kao Corporation), 8 parts by weight of 2-hydroxyethyl acrylate, 0.4 parts by weight of 2,2'-azobisisobutyronitrile as a polymerization initiator, and 312 parts by weight of ethyl acetate. While the mixture was gently stirred, nitrogen gas was introduced, and a polymerization reaction was performed for 6 hours, while the temperature of the liquid in the flask was kept at about 65° C., so that an acryl-based polymer (B) solution (40% by weight) was prepared. The acryl-based polymer (B) had a weight average molecular weight of 410,000, a measured glass transition temperature (Tg) of −53° C., and an acid value of 0.0.

[Acryl-Based Polymer (C)]

To a four-neck flask equipped with a stirring blade, a thermometer, a nitrogen gas introducing tube, and a condenser were added 200 parts by weight of 2-ethylhexyl acrylate, 8 parts by weight of acrylic acid, 0.4 parts by weight of 2,2'-azobisisobutyronitrile as a polymerization initiator, and 312 parts by weight of ethyl acetate. While the mixture was gently stirred, nitrogen gas was introduced, and a polymerization reaction was performed for 6 hours, while the temperature of the liquid in the flask was kept at about 65° C., so that an acryl-based polymer (C) solution (40% by weight) was prepared. The acryl-based polymer (C) had a weight average molecular weight of 540,000, a theoretical glass transition temperature (Tg) of −66° C., a measured Tg of −60°, and an acid value of 29.5.

<Preparation of Antistatic Agent Solutions)

[Antistatic Agent Solution (a)]

To a four-neck flask equipped with a stirring blade, a thermometer, and a condenser were added 15 parts by weight of lithium perchlorate (manufactured by NACALAI TESQUE, INC.), 35 parts by weight of an organopolysiloxane having a polyoxyalkylene side chain (KF-353 manufactured by Shin-Etsu Chemical Co., Ltd., 10 in HLB value), and 200 parts by weight of ethyl acetate. While the temperature of the liquid in the flask was kept at about 80° C., the materials were mixed and stirred for 2 hours, so that an antistatic agent solution (a) (20% by weight) was prepared.

[Antistatic Agent Solution (b)]

To a four-neck flask equipped with a stirring blade, a thermometer, and a condenser were added 15 parts by weight of lithium perchlorate (manufactured by NACALAI TESQUE, INC.), 35 parts by weight of an organopolysiloxane having a polyoxyalkylene side chain (KF-6011 manufactured by Shin-Etsu Chemical Co., Ltd., 12 in HLB value), and 200 parts by weight of ethyl acetate. While the temperature of the liquid in the flask was kept at about 80° C., the materials were mixed and stirred for 2 hours, so that an antistatic agent solution (b) (20% by weight) was prepared.

[Antistatic Agent Solution (c)]

To a four-neck flask equipped with a stirring blade, a thermometer, and a condenser were added 15 parts by weight of lithium trifluoromethanesulfonate (manufactured by Kishida Chemical Co., Ltd.), 35 parts by weight of an organopolysiloxane having a polyoxyalkylene side chain (KF-353 manufactured by Shin-Etsu Chemical Co., Ltd., 10 in HLB value), and 200 parts by weight of ethyl acetate. While the temperature of the liquid in the flask was kept at about 80° C., the materials were mixed and stirred for 2 hours, so that an antistatic agent solution (c) (20% by weight) was prepared.

[Antistatic Agent Solution (d)]

To a four-neck flask equipped with a stirring blade, a thermometer, and a condenser were added 10 parts by weight of lithium perchlorate (manufactured by NACALAI TESQUE, INC.), 40 parts by weight of an organopolysiloxane having a polyoxyalkylene side chain (KF-353 manufactured by Shin-Etsu Chemical Co., Ltd., 10 in HLB value), and 200 parts by weight of ethyl acetate. While the temperature of the liquid in the flask was kept at about 80° C., the materials were mixed and stirred for 2 hours, so that an antistatic agent solution (d) (20% by weight) was prepared.

[Antistatic Agent Solution (e)]

To a four-neck flask equipped with a stirring blade, a thermometer, and a condenser were added 25 parts by weight of lithium perchlorate (manufactured by NACALAI TESQUE, INC.), 25 parts by weight of an organopolysiloxane having a polyoxyalkylene side chain (KF-353 manufactured by Shin-Etsu Chemical Co., Ltd.), and 200 parts by weight of ethyl acetate. While the temperature of the liquid in the flask was kept at about 80° C., the materials were mixed and stirred for 2 hours, so that an antistatic agent solution (e) (20% by weight) was prepared.

[Antistatic Agent Solution (f)]

To a four-neck flask equipped with a stirring blade, a thermometer, and a condenser were added 15 parts by weight of lithium perchlorate (manufactured by NACALAI TESQUE, INC.), 35 parts by weight of polyethylene glycol (diol-terminated, 2,000 in molecular weight, manufactured by Wako Pure Chemical Industries, Ltd.), and 200 parts by weight of methanol. While the temperature of the liquid in the flask was kept at about 50° C., the materials were mixed and stirred for 2 hours, so that an antistatic agent solution (f) (20% by weight) was prepared.

Example 1

Preparation of Pressure-Sensitive Adhesive Solution

The acryl-based polymer (A) solution (40% by weight) was diluted to 20% by weight with ethyl acetate. To 100 parts by weight of the resulting solution were added 0.05 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (1) was prepared. In the acryl-based pressure-sensitive adhesive solution (1), the amount of the alkali metal salt (lithium salt) was 0.075 parts by weight, based on 100 parts by weight of the acryl-based polymer. The amount of the organopolysiloxane having a polyoxyalkylene side chain was 0.175 parts by weight, based on 100 parts by weight of the acryl-based polymer. The total amount of the alkali metal salt (lithium salt) and the organopolysiloxane having a polyoxyalkylene side chain was 0.25 parts by weight. The weight ratio of the alkali metal salt (lithium salt) to the organopolysiloxane having a polyoxyalkylene side chain was 30:70.

[Preparation of Pressure-Sensitive Adhesive Sheet]

The acryl-based, pressure-sensitive adhesive solution (1) was applied to the opposite surface of an antistatic-treated polyethylene terephthalate film (T100G38 manufactured by Mitsubishi Plastics, Inc.) from its antistatic-treated surface and heated at 130° C. for 2 minutes so that a 15 μm thick pressure-sensitive adhesive layer was formed. A polyethylene terephthalate film (25 μm in thickness) with one side treated with silicone was then provided, and the silicone-treated surface of the polyethylene terephthalate film was bonded to the surface of the pressure-sensitive adhesive layer, so that a pressure-sensitive adhesive sheet was obtained.

Example 2

Preparation of Pressure-Sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (2) was prepared. In the acryl-based pressure-sensitive adhesive solution (2), the amount of the alkali metal salt (lithium salt) was 0.15 parts by weight, based on 100 parts by weight of the acryl-based polymer. The amount of the organopolysiloxane having a polyoxyalkylene side chain was 0.35 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 30:70.
[Preparation of Pressure-Sensitive Adhesive Sheet]
A pressure-sensitive adhesive sheet was prepared by the same method as in Example 1, except that the acryl-based pressure-sensitive adhesive solution (2) was used in place of the acryl-based pressure-sensitive adhesive solution (1).

Example 3

Preparation of Pressure-Sensitive Adhesive Solution

The acryl-based polymer (A) solution (40% by weight) was diluted to 20% by weight with ethyl acetate. To 100 parts by weight of the resulting solution were added 0.20 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (3) was prepared. In the acryl-based pressure-sensitive adhesive solution (3), the amount of the alkali metal salt (lithium salt) was 0.3 parts by weight, based on 100 parts by weight of the acryl-based polymer. The amount of the organopolysiloxane having a polyoxyalkylene side chain was 0.7 parts by weight, based on 100 parts by weight of the acryl-based polymer. The total amount of the alkali metal salt (lithium salt) and the organopolysiloxane having a polyoxyalkylene side chain was 1.0 part by weight. The weight ratio of the alkali metal salt (lithium salt) to the organopolysiloxane having a polyoxyalkylene side chain was 30:70.
[Preparation of Pressure-Sensitive Adhesive Sheet]
A pressure-sensitive adhesive sheet was prepared by the same method as in Example 1, except that the acryl-based pressure-sensitive adhesive solution (3) was used in place of the acryl-based pressure-sensitive adhesive solution (1).

Example 4

Preparation of Pressure-Sensitive Adhesive Solution

The acryl-based polymer (A) solution (40% by weight) was diluted to 20% by weight with ethyl acetate. To 100 parts by weight of the resulting solution were added 0.60 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (4) was prepared. In the acryl-based pressure-sensitive adhesive solution (4), the amount of the alkali metal salt (lithium salt) was 0.9 parts by weight, based on 100 parts by weight of the acryl-based polymer. The amount of the organopolysiloxane having a polyoxyalkylene side chain was 2.1 parts by weight, based on 100 parts by weight of the acryl-based polymer. The total amount of the alkali metal salt (lithium salt) and the organopolysiloxane having a polyoxyalkylene side chain was 3.0 parts by weight. The weight ratio of the alkali metal salt (lithium salt) to the organopolysiloxane having a polyoxyalkylene side chain was 30:70.
[Preparation of Pressure-Sensitive Adhesive Sheet]
A pressure-sensitive adhesive sheet was prepared by the same method as in Example 1, except that the acryl-based pressure-sensitive adhesive solution (4) was used in place of the acryl-based pressure-sensitive adhesive solution (1).

Example 5

Preparation of Pressure-Sensitive Adhesive Solution

The acryl-based polymer (B) solution (40% by weight) was diluted to 20% by weight with ethyl acetate. To 100 parts by weight of the resulting solution were added 0.1 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (5) was prepared. In the acryl-based pressure-sensitive adhesive solution (5), the amount of the alkali metal salt (lithium salt) was 0.15 parts by weight, based on 100 parts by weight of the acryl-based polymer. The amount of the organopolysiloxane having a polyoxyalkylene side chain was 0.35 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 30:70.
[Preparation of Pressure-Sensitive Adhesive Sheet]
A pressure-sensitive adhesive sheet was prepared by the same method as in Example 1, except that the acryl-based pressure-sensitive adhesive solution (5) was used in place of the acryl-based pressure-sensitive adhesive solution (1).

Example 6

Preparation of Pressure-Sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (b) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (6) was prepared. In the acryl-based pressure-sensitive adhesive solution (6), the amount of the alkali metal salt (lithium salt) was 0.15 parts by weight, based on 100 parts by weight of the acryl-based polymer. The amount of the organopolysiloxane having a polyoxyalkylene side chain was 0.35 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 30:70.

[Preparation of Pressure-Sensitive Adhesive Sheet]

A pressure-sensitive adhesive sheet was prepared by the same method as in Example 1, except that the acryl-based pressure-sensitive adhesive solution (6) was used in place of the acryl-based pressure-sensitive adhesive solution (1).

Example 7

Preparation of Pressure-Sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (c) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (7) was prepared. In the acryl-based pressure-sensitive adhesive solution (7), the amount of the alkali metal salt (lithium salt) was 0.15 parts by weight, based on 100 parts by weight of the acryl-based polymer. The amount of the organopolysiloxane having a polyoxyalkylene side chain was 0.35 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 30:70.

[Preparation of Pressure-Sensitive Adhesive Sheet]

A pressure-sensitive adhesive sheet was prepared by the same method as in Example 1, except that the acryl-based pressure-sensitive adhesive solution (7) was used in place of the acryl-based pressure-sensitive adhesive solution (1).

Example 8

Preparation of Pressure-Sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (d) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (8) was prepared. In the acryl-based pressure-sensitive adhesive solution (8), the amount of the alkali metal salt (lithium salt) was 0.1 parts by weight, based on 100 parts by weight of the acryl-based polymer. The amount of the organopolysiloxane having a polyoxyalkylene side chain was 0.4 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 20:80.

[Preparation of Pressure-Sensitive Adhesive Sheet]

A pressure-sensitive adhesive sheet was prepared by the same method as in Example 1, except that the acryl-based pressure-sensitive adhesive solution (8) was used in place of the acryl-based pressure-sensitive adhesive solution (1).

Example 9

Preparation of Pressure-sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (e) (20% by weight), 0.5 parts by weight of an isocyanurate of hexamethylene diisocyanate (CORONATE HX manufactured by NIPPON POLYURETHANE INDUSTRY CO., LTD., 100% by weight) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (9) was prepared. In the acryl-based pressure-sensitive adhesive solution (9), the amount of the alkali metal salt (lithium salt) was 0.25 parts by weight, based on 100 parts by weight of the acryl-based polymer. The amount of the organopolysiloxane having a polyoxyalkylene side chain was 0.25 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 50:50.

[Preparation of Pressure-Sensitive Adhesive Sheet]

A pressure-sensitive adhesive sheet was prepared by the same method as in Example 1, except that the acryl-based pressure-sensitive adhesive solution (9) was used in place of the acryl-based pressure-sensitive adhesive solution (1).

Comparative Example 1

Preparation of Pressure-Sensitive Adhesive Solution

An acryl-based, pressure-sensitive adhesive solution (10) was prepared by the same method as in Example 1, except that the antistatic agent solution (a) was not used.

[Preparation of Pressure-Sensitive Adhesive Sheet]

A pressure-sensitive adhesive sheet was prepared by the same method as in Example 1, except that the acryl-based pressure-sensitive adhesive solution (10) was used in place of the acryl-based pressure-sensitive adhesive solution (1).

Comparative Example 2

Preparation of Pressure-Sensitive Adhesive Solution

The acryl-based polymer (A) solution (40% by weight) was diluted to 20% by weight with ethyl acetate. To 100 parts by weight of the resulting solution were added 0.1 parts by weight of the antistatic agent solution (f) (20% by weight), 0.5 parts by weight of an isocyanurate of hexamethylene diisocyanate (CORONATE HX manufactured by NIPPON POLYURETHANE INDUSTRY CO., LTD.) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (11) was prepared. In the acryl-based pressure-sensitive adhesive solution (11), the amount of the alkali metal salt (lithium salt) was 0.15 parts by weight, based on 100 parts by weight of the acryl-based polymer. The amount of polyethylene glycol was 0.35 parts by weight, based on 100 parts by weight of the acryl-based polymer. The total amount of the alkali metal salt (lithium salt) and polyethylene glycol was 0.5 parts by weight. The weight ratio of the alkali metal salt (lithium salt) to polyethylene glycol was 30:70.

[Preparation of Pressure-Sensitive Adhesive Sheet]

A pressure-sensitive adhesive sheet was prepared by the same method as in Example 1, except that the acryl-based pressure-sensitive adhesive solution (11) was used in place of the acryl-based pressure-sensitive adhesive solution (1).

Comparative Example 3

Preparation of Pressure-Sensitive Adhesive Solution

The acryl-based polymer (C) solution (40% by weight) was diluted to 20% by weight with ethyl acetate. To 100 parts by weight of the resulting solution were added 0.1 parts by weight of the antistatic agent solution (a) (20% by weight), 0.44 parts by weight of 1,3-bis(NN-diglycidylaminomethyl)cyclohexane (TETRAD-C manufactured by MITSUBISHI GAS CHEMICAL COMPANY, INC.) as a crosslinking agent, 0.12 parts by weight of an isocyanurate of hexamethylene diisocyanate (CORONATE HX manufactured by NIPPON POLYURETHANE INDUSTRY CO., LTD.) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (12) was prepared. In the acryl-based pressure-sensitive adhesive solution (12), the amount of the alkali metal salt (lithium salt) was 0.15 parts by weight, based on 100 parts by weight of the acryl-based polymer. The amount of the organopolysiloxane having a polyoxyalkylene side chain was 0.35 parts by weight, based on 100 parts by weight of the acryl-based polymer. The total amount of the alkali metal salt (lithium salt) and the organopolysiloxane having a polyoxyalkylene side chain was 0.5 parts by weight. The weight ratio of the alkali metal salt (lithium salt) to the organopolysiloxane having a polyoxyalkylene side chain was 30:70.

[Preparation of Pressure-Sensitive Adhesive Sheet]

A pressure-sensitive adhesive sheet was prepared by the same method as in Example 1, except that the acryl-based pressure-sensitive adhesive solution (12) was used in place of the acryl-based pressure-sensitive adhesive solution (1).

Comparative Example 4

Preparation of Pressure-Sensitive Adhesive Solution

The acryl-based polymer (A) solution (40% by weight) was diluted to 20% by weight with ethyl acetate. To 100 parts by weight of the resulting solution were added 0.02 parts by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD.) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (13) was prepared. In the acryl-based pressure-sensitive adhesive solution (13), the amount of the alkali metal salt (lithium salt) was 0.03 parts by weight, based on 100 parts by weight of the acryl-based polymer. The amount of the organopolysiloxane having a polyoxyalkylene side chain was 0.07 parts by weight, based on 100 parts by weight of the acryl-based polymer. The total amount of the alkali metal salt (lithium salt) and the organopolysiloxane having a polyoxyalkylene side chain was 0.1 parts by weight. The weight ratio of the alkali metal salt (lithium salt) to the organopolysiloxane having a polyoxyalkylene side chain was 30:70.

[Preparation of Pressure-Sensitive Adhesive Sheet]

A pressure-sensitive adhesive sheet was prepared by the same method as in Example 1, except that the acryl-based pressure-sensitive adhesive solution (13) was used in place of the acryl-based pressure-sensitive adhesive solution (1).

Comparative Example 5

Preparation of Pressure-Sensitive Adhesive Solution

The acryl-based polymer (A) solution (40% by weight) was diluted to 20% by weight with ethyl acetate. To 100 parts by weight of the resulting solution were added 1.0 part by weight of the antistatic agent solution (a) (20% by weight), 0.5 parts by weight of an isocyanurate of hexamethylene diisocyanate (CORONATE HX manufactured by NIPPON POLYURETHANE INDUSTRY CO., LTD.) as a crosslinking agent, and 0.4 parts by weight of dibutyltin dilaurate (a 1% by weight ethyl acetate solution) as a crosslinking catalyst, and mixed and stirred, so that an acryl-based, pressure-sensitive adhesive solution (14) was prepared. In the acryl-based pressure-sensitive adhesive solution (14), the amount of the alkali metal salt (lithium salt) was 1.5 parts by weight, based on 100 parts by weight of the acryl-based polymer. The amount of the organopolysiloxane having a polyoxyalkylene side chain was 3.5 parts by weight, based on 100 parts by weight of the acryl-based polymer. The total amount of the alkali metal salt (lithium salt) and the organopolysiloxane having a polyoxyalkylene side chain was 5.0 parts by weight. The weight ratio of the alkali metal salt (lithium salt) to the organopolysiloxane having a polyoxyalkylene side chain was 30:70.

[Preparation of Pressure-Sensitive Adhesive Sheet]

A pressure-sensitive adhesive sheet was prepared by the same method as in Example 1, except that the acryl-based pressure-sensitive adhesive solution (14) was used in place of the acryl-based pressure-sensitive adhesive solution (1).

According to the above methods, the prepared pressure-sensitive adhesive sheets were measured for peeling electrification voltage and adhesive power and evaluated for staining properties. The obtained results are shown in Table 1.

TABLE 1

| Evaluation items Protected material | Peeling electrification voltage (kV) | | Peel rate 0.3 m/min Adhesive power (N/25 mm) | | Peel rate 30 m/min Adhesive power (N/25 mm) | | Staining properties (—) | |
|---|---|---|---|---|---|---|---|---|
| | TAC polarizing plate | AG polarizing plate | TAC polarizing plate | AG polarizing plate | TAC polarizing plate | AG polarizing plate | TAC polarizing plate | AG polarizing plate |
| Example 1 | −0.6 | −0.8 | 0.06 | 0.05 | 1.27 | 0.81 | ○ | ○ |
| Example 2 | 0.0 | 0.0 | 0.04 | 0.04 | 0.88 | 0.76 | ○ | ○ |
| Example 3 | 0.0 | 0.0 | 0.03 | 0.03 | 0.65 | 0.63 | ○ | ○ |
| Example 4 | 0.0 | 0.0 | 0.03 | 0.02 | 0.32 | 0.36 | ○ | ○ |
| Example 5 | 0.0 | 0.0 | 0.05 | 0.03 | 1.25 | 0.85 | ○ | ○ |
| Example 6 | −0.1 | −0.6 | 0.04 | 0.05 | 1.05 | 0.92 | ○ | ○ |
| Example 7 | 0.0 | 0.0 | 0.07 | 0.04 | 1.76 | 0.95 | ○ | ○ |
| Example 8 | 0.0 | 0.0 | 0.05 | 0.04 | 1.03 | 0.87 | ○ | ○ |
| Example 9 | 0.0 | 0.0 | 0.06 | 0.03 | 1.18 | 0.64 | ○ | ○ |
| Comparative Example 1 | −1.9 | −1.7 | 0.10 | 0.08 | 1.75 | 0.92 | ○ | ○ |
| Comparative Example 2 | 0 | −2.2 | 0.30 | 0.19 | 5.45 | 2.58 | ○ | ○ |
| Comparative Example 3 | −0.2 | −2.9 | 0.37 | 0.20 | 3.50 | *0.27 | ○ | ○ |
| Comparative Example 4 | −2.0 | −1.9 | 0.09 | 0.06 | 1.48 | 0.78 | ○ | ○ |
| Comparative Example 5 | −0.1 | 0.0 | 0.04 | 0.02 | 0.44 | 0.43 | X | X |

In Table 1, the value marked with * was low due to the occurrence of the stick-slip phenomenon (in which instantaneous peel and stick are repeated).

The results in Table 1 show that when the pressure-sensitive adhesive composition prepared according to the invention was used, which contained an alkali metal salt and an organopolysiloxane having a polyoxyalkylene side chain (Examples 1 to 9), the absolute value of the peeling electrification voltage of the polarizing plate was reduced to a low value below 1.0 kV, no staining was observed, and transparency was provided in all the examples.

It is also apparent that the pressure-sensitive adhesive sheet of each of Examples 1 to 9 according to the invention has a 180° peel adhesion in the range of 0.25 N/25 mm or less at a peel rate of 0.3 m/min and a 180° peel adhesion in the range of 3.0 N/25 mm or less at a peel rate of 30 m/min, and therefore is suitable for use as a removable, surface protecting film.

In contrast, when no alkali metal salt and no organopolysiloxane having a polyoxyalkylene side chain were added (Comparative Example 1), the adhesive power was low, and the absolute value of the peeling electrification voltage was high and exceeded 1.0 kV, although staining of the polarizing plate was not observed. When polyethylene glycol was used in place of an organopolysiloxane having a polyoxyalkylene side chain (Comparative Example 2), the adhesive power to the TAC polarizing plate exceeded 3.0 N/25 mm, and the absolute value of the peeling electrification voltage of the AG polarizing plate was high and exceeded 1.0 kV, although staining of the polarizing plate was not observed. When an acryl-based polymer with an acid value of at least 1.0 was used (Comparative Example 3), the absolute value of the peeling electrification voltage of the AG polarizing plate was as high as at least 1.0 kV, and the adhesive power to the TAC polarizing plate was high and exceeded 3.0 N/25 mm, although staining of the polarizing plate was not observed. When the pressure-sensitive adhesive composition used contained less than 0.15 parts by weight of the alkali metal salt and the organopolysiloxane having a polyoxyalkylene side chain based on 100 parts by weight of the acrylic polymer (Comparative Example 4), the adhesive power was low, and the absolute value of the peeling electrification voltage was high and exceeded 1.0 kV, although staining of the polarizing plate was not observed. When the pressure-sensitive adhesive composition used contained more than 4 parts by weight of the alkali metal salt and the organopolysiloxane having a polyoxyalkylene side chain based on 100 parts by weight of the acrylic polymer (Comparative Example 5), staining of the polarizing plate was observed, although the peeling electrification voltage was kept at a low level. It has therefore been found that none of the pressure-sensitive adhesive compositions of the comparative examples can simultaneously achieve reduction of peeling electrification voltage, prevention of staining of a polarizing plate, and easy peelability, and are suitable for antistatic pressure-sensitive adhesive sheets.

As a result, it has been demonstrated that the pressure-sensitive adhesive composition of the invention has good antistatic properties during peeling, is reduced in the risk of staining the protected material, and has good removability.

The invention claimed is:

1. A pressure-sensitive adhesive composition, comprising:
   a (meth)acryl-based polymer that comprises, as a main component, a (meth)acryl-based monomer component having an alkyl group of 1 to 14 carbon atoms and has an acid value of 1.0 or less;
   a conductive agent, wherein the conductive agent consists of an alkali metal salt; and
   an organopolysiloxane having a polyoxyalkylene side chain, wherein
   the total amount of the alkali metal salt and the organopolysiloxane is from 0.15 to 4 parts by weight, based on 100 parts by weight of the (meth)acryl-based polymer, and said organopolysiloxane having a polyoxyalkylene side chain increases the removability of said pressure-sensitive adhesive composition when attached to an adherend wherein, when said pressure-sensitive adhesive composition is formed as a pressure-sensitive adhesive layer, the pressure-sensitive adhesive layer has a 180° peel adhesion of 0.25 N/25 mm or less to a polarizing plate surface under conditions of 23° C. and 50% RH at a peel rate of 0.3 m/minute, and the pressure-sensitive adhesive layer has a 180° peel adhesion of 3.0 N/25 mm or less to a polarizing plate surface under conditions of 23° C. and 50% RH at a peel rate of 30 m/minute.

2. The pressure-sensitive adhesive composition according to claim 1, wherein the organopolysiloxane is represented by the formula:

[Formula 1]

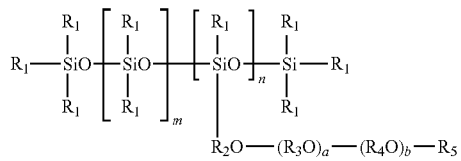

wherein $R_1$ represents a monovalent organic group, $R_2$, $R_3$, and $R_4$ each represent an alkylene group, or $R_5$ represents a hydroxyl group or an organic group, m and n each represent an integer of 0 to 1,000, provided that m and n are not simultaneously 0, and a and b each represent an integer of 0 to 100, provided that a and b are not simultaneously 0.

3. The pressure-sensitive adhesive composition according to claim 1, wherein the alkali metal salt is a lithium salt.

4. The pressure-sensitive adhesive composition according to claim 1, wherein the (meth)acryl-based polymer further comprises a hydroxyl group-containing (meth)acryl-based monomer component.

5. The pressure-sensitive adhesive composition according to claim 1, wherein the (meth)acryl-based polymer further comprises 5.0% by weight or less of an alkylene oxide group-containing reactive monomer component with an average addition mole number of oxyalkylene units of 3 to 40.

6. A pressure-sensitive adhesive layer comprising a product produced by crosslinking the pressure-sensitive adhesive composition according to claim 1.

7. A pressure-sensitive adhesive sheet, comprising a backing film and the pressure-sensitive adhesive layer according to claim 6 formed on one or both sides of the backing film.

8. The pressure-sensitive adhesive sheet according to claim 7, wherein the backing film is an antistatic-treated plastic film.

9. The pressure-sensitive adhesive composition according to claim 2, wherein the (meth)acryl-based polymer further comprises a hydroxyl group-containing (meth)acryl-based monomer component.

10. The pressure-sensitive adhesive composition according to claim 2, wherein the (meth)acryl-based polymer further comprises 5.0% by weight or less of an alkylene oxide group-containing reactive monomer component with an average addition mole number of oxyalkylene units of 3 to 40.

11. A pressure-sensitive adhesive layer comprising a product produced by crosslinking the pressure-sensitive adhesive composition according to claim 2.

12. The pressure-sensitive adhesive composition according to claim 1, wherein a content ratio of the alkali metal salt to the organopolysiloxane by weight is from 20:80 to 50:50.

13. The pressure-sensitive adhesive composition according to claim 2, wherein a content ratio of the alkali metal salt to the organopolysiloxane by weight is from 20:80 to 50:50.

14. A pressure-sensitive adhesive sheet, comprising a backing film and a pressure-sensitive adhesive layer formed on one or both sides of the backing film, wherein
the pressure-sensitive adhesive layer is produced by crosslinking a pressure-sensitive adhesive composition,
the pressure-sensitive adhesive layer has a 180° peel adhesion of 0.25 N/25 mm or less to a polarizing plate surface under conditions of 23° C. and 50% RH at a peel rate of 0.3 m/minute, and
the pressure-sensitive adhesive layer has a 180° peel adhesion of 3.0 N/25 mm or less to a polarizing plate surface under conditions of 23° C. and 50% RH at a peel rate of 30 m/minute
wherein the pressure-sensitive adhesive composition comprises:
a (meth)acryl-based polymer that comprises, as a main component, a (meth)acryl-based monomer component having an alkyl group of 1 to 14 carbon atoms and has an acid value of 1.0 or less;
a conductive agent, wherein the conductive agent consists of an alkali metal salt; and
an organopolysiloxane having a polyoxyalkylene side chain, wherein
the total amount of the alkali metal salt and the organopolysiloxane is from 0.15 to 4 parts by weight, based on 100 parts by weight of the (meth)acryl-based polymer, and
said organopolysiloxane having a polyoxyalkylene side chain increases the removability of said pressure-sensitive adhesive composition when attached to an adherend.

* * * * *